US007655891B2

(12) United States Patent
Suzuki et al.

(10) Patent No.: US 7,655,891 B2
(45) Date of Patent: Feb. 2, 2010

(54) CHARGED-PARTICLE DETECTING APPARATUS

(75) Inventors: Akio Suzuki, Hamamatsu (JP); Masahiro Hayashi, Hamamatsu (JP); Katsutoshi Nonaka, Hamamatsu (JP); Yuuya Washiyama, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 487 days.

(21) Appl. No.: 11/723,951

(22) Filed: Mar. 22, 2007

(65) Prior Publication Data

US 2008/0230686 A1 Sep. 25, 2008

(51) Int. Cl.

| | |
|---|---|
| ***H01J 49/06*** | (2006.01) |
| ***G01T 1/28*** | (2006.01) |
| ***G01T 1/29*** | (2006.01) |
| ***H01J 43/24*** | (2006.01) |

(52) U.S. Cl. ............................... 250/207; 250/214 VT; 313/103 CM; 313/105 CM

(58) Field of Classification Search ................. 250/207, 250/214 VT, 397, 283, 287, 299, 300; 313/103 CM, 313/105 CM See application file for complete search history.

(56) References Cited

U.S. PATENT DOCUMENTS

| | | | | |
|---|---|---|---|---|
| 5,391,874 | A | 2/1995 | Ellis | |
| 5,770,858 | A | 6/1998 | Fuchs et al. | |
| 6,265,812 | B1 | 7/2001 | Watanabe et al. | |
| 6,828,729 | B1 | 12/2004 | Owens et al. | |
| 6,958,474 | B2 | 10/2005 | Laprade et al. | |
| 7,026,177 | B2 | 4/2006 | Laprade | |
| 7,564,043 | B2 * | 7/2009 | Hayashi et al. | 250/397 |
| 2008/0230686 | A1 * | 9/2008 | Suzuki et al. | 250/281 |
| 2008/0248585 | A1 * | 10/2008 | Chen et al. | 436/89 |
| 2008/0290267 | A1 * | 11/2008 | Hayashi et al. | 250/282 |

FOREIGN PATENT DOCUMENTS

| | | |
|---|---|---|
| JP | 6-28997 | 2/1994 |

* cited by examiner

*Primary Examiner*—John R Lee
(74) *Attorney, Agent, or Firm*—Drinker Biddle & Reath LLP

(57) ABSTRACT

The present invention relates to a charged-particle detecting apparatus having a structure which enables adjustment of a potential distribution so as to stably maintain flight loci of charged particles without depending on a change in a voltage-applied state. The charged-particle detecting apparatus comprises a first electrode, an MCP, a second electrode, a third electrode that functions as an anode, and a rear cover arranged in order along a predetermined reference axis. The third electrode is arranged on the opposite side of the MCP with respect to the second electrode, and is electrically connected to an output signal part via a capacitor. In particular, the first electrode is arranged so as to become a part of the outer surface of the charged-particle detecting apparatus, and components positioned between the first electrode and the rear cover have contours with section sizes equal to or smaller than that of the contour of the first electrode when viewed from the first electrode side toward the rear cover.

9 Claims, 26 Drawing Sheets

CHARGED-PARTICLE DETECTING APPARATUS

BACKGROUND OF THE INVENTION

1. Field of the Invention

The present invention relates to a charged-particle detecting apparatus which detects charged particles such as electrons and ions as a detector to be applied to time-of-flight mass spectrometry or the like.

2. Related Background Art

As a method for detecting a molecular weight of a polymer, time-of-flight mass spectrometry (TOF-MS) is known. FIG. 1 is a drawing for explaining this TOF-MS.

As shown in FIG. 1, in the TOF-MS, a detector 100 is set on one end in a vacuum vessel 110, and a sample 120 is arranged on the other end in the vacuum vessel 110. Between these, an electrode 130 having an opening is arranged. The electrode 130 is grounded, and when a predetermined voltage is applied to the sample 120, ions emitted from the sample 120 are accelerated by an electric field formed between the sample 120 and the electrode 130, and collide with the detector 100. The acceleration energy to be given to the ions between the sample 120 and the electrode 130 is determined according to ion charge. Therefore, when the ion charge is the same, the speed when passing the electrode 130 depends on the weight of ions. Between the electrode 130 and the detector 100, ions fly at a constant speed, so that the flight time of the ions from the electrode 130 to the detector 100 is in inverse proportion to the speed. That is, by calculating the flight time from the electrode 130 to the detector 100, the weight of ions can be judged.

As such a detector, for example, the detector disclosed in Japanese Patent Application Laid-Open No. 06-28997 (Document 1) is applicable. FIG. 2 is a schematic cross-sectional view showing an example of a detector applicable to TOP-SM. In the detector 100a shown in FIG. 2, two micro channel plates (MCP) 20 and 21 (hereinafter, referred to as a MCP group 2) are sandwiched between an IN electrode 1 and an OUT electrode 3 which have openings in their central portions. In front of the IN electrode 1, a wire-mesh grid electrode 106 retained by a frame 105 is arranged, and on the other hand, behind the OUT electrode 3, an anode electrode 4 is arranged. To the shielding side of a signal reading BNC terminal (Bayonet Neil-Concelman connector) 60, a casing 5*x* comprised of a conductive material is connected, and on the other hand, to the core 601 side, an electrode 47 is connected. Between the casing 5*x* and the OUT electrode 3, and between the electrode 47 and the anode electrode 4, dielectric bodies 22 and 46 are arranged, respectively, to form a capacitor.

In the detector 100*a* structured as described above, when charged particles are made incident on the MCP group 2, many electrons (secondary electrons multiplied by each MCP) are responsively emitted from the MCP group 2. The secondary electrons thus emitted arrive at the anode electrode 4 and are converted into an electric signal as a voltage or current change (signal is outputted from the core 601). At this time, a capacitor is formed between the anode electrode 4 and the core 601, so that the detection signal is outputted to the outside at a ground potential, and the capacitor formed between the casing 5*x* and the OUT electrode 3 suppresses waveform distortion or ringing of the output signal.

SUMMARY OF THE INVENTION

The present inventors have examined the above conventional detector in detail, and as a result, have discovered the following problems.

That is, the detector disclosed in the above-described Document 1 was developed by assuming application to an ultra fast electron detector, a photomultiplier tube, or the like as a principal use, and a voltage-applied state to electrodes including the anode electrode 4 is maintained as predetermined. On the other hand, in a detector for TOF-MS, the voltage to be applied to each electrode must be changed between the time of detection of cation and the time of detection of anion together with its sign (positive or negative). However, when the voltage-applied state to the electrodes differs, accordingly, potential distribution formed near the detecting surface of the detector may also differ. When the difference in formed potential distribution becomes conspicuous, the loci of ions that came flying (flight locus) also greatly differ between the time of detection of cation and the time of detection of anion. In this case, the number of ions arriving at the detecting surface and the flight time differ among the different voltage-applied states (detection characteristics differ). Furthermore, the output waveforms also differ according to the different voltage-applied states, so that even when a sufficient measure for suppressing waveform distortion and ringing is taken when detecting ions having a predetermined polarity (positive or negative), at the time of detection of ions with reverse polarity, satisfactory detection results may not be obtained.

The present invention has been developed to eliminate the problems described above. It is an object of the present invention to provide a charged-particle detecting apparatus having a structure which enables adjustment of potential distribution so that the flight loci of charged particles are stably maintained without depending on a change in a voltage-applied state.

To solve the above-described problem, a charged-particle detecting apparatus according to the present invention comprises a first electrode, an MCP, a second electrode, and a third electrode arranged in order along a predetermined reference axis, and this charged-particle detecting apparatus further comprises a signal output part, and a rear cover provided so that the reference axis passes through its internal space. In detail, the MCP is an electron multiplying means which is arranged on a plane crossing the reference axis and emits secondary electrons multiplied therein in response to incidence of charged particles. The MCP has an incidence surface on which the charged particles are made incident and an exit surface which faces the incidence surface and emits secondary electrons. The first electrode is arranged so as to cover the incidence surface of the MCP in the state that it crosses the reference axis. In this first electrode, an opening for passage of the charged particles going toward the MCP is formed. The second electrode is arranged so as to sandwich the MCP together with the first electrode while crossing the reference axis. Also, in this second electrode, an opening for passage of the secondary electrons emitted from the exit surface of the MCP is formed. The third electrode is arranged so as to sandwich the second electrode together with the MCP while crossing the reference axis. The signal processor has a signal line electrically connected to the third electrode. The rear cover is arranged so as to be positioned on the opposite side of the MCP with respect to the third electrode in a state that the reference axis passes through its internal space.

In particular, in the charged-particle detecting apparatus according to the present invention structured as described above, the surface of the first electrode, excluding a region facing the MCP, is exposed so as to function as a part of the outer surface of the charged-particle detecting apparatus. The contours of at least the MCP, the second electrode, and the third electrode arranged between the first electrode and the rear cover along the reference axis have section sizes equal to or smaller than that of the contour of the first electrode when they are viewed from the first electrode side toward the rear cover.

In this construction, viewing from the incidence direction of the charged particles, the components (the MCP, the second electrode, and the third electrode) positioned between the first electrode and the rear cover are covered by the first electrode, so that only the surface of the first electrode, excluding the region directly facing the MCP, is exposed. Thus, no electrodes or conductive parts partially project in the radial direction of the first electrode (matching with a direction orthogonal to the reference axis) or are arranged closer to the charged-particle incidence surface than the first electrode, so that the potential distribution formed around the first electrode is comparatively simplified. The surface of the first electrode, excluding the region facing the MCP, mainly means an outside region opposing a facing region to the MCP and the side surface of the first electrode.

The charged-particle detecting apparatus according to the present invention may further include a first capacitor arranged between the third electrode and the rear cover. That is, one end of the first capacitor is electrically connected to the signal line of the signal output part, and the other end is electrically connected to the third electrode. The first capacitor enables outputting of a detection signal to the outside of the charged-particle detecting apparatus at a ground potential.

The signal output part may include a coaxial cable having the signal line and a shield surrounding the signal line. The charged-particle detecting apparatus according to the present invention may further comprise a second capacitor arranged between the MCP and the rear cover. That is, one end of the second capacitor is electrically connected to the shield, and the other end is electrically connected to the second electrode. The second capacitor functions to suppress ringing of output signals.

Furthermore, the charged-particle detecting apparatus according to the present invention may further comprise an insulating member for housing the second capacitor in a state that the third electrode is fixed. In this case, the apparatus construction is simplified. Alternatively, the second capacitor may be arranged inside a support column which fixes each electrode. The second capacitor may have a cylindrical shape and be arranged while covering at least the outer edge of the third electrode. In this case, the second capacitor functions as a shield.

In the charged-particle detecting apparatus according to the present invention, preferably, a maximum width of the first electrode along the direction orthogonal to the reference axis (corresponding to the outer diameter of the first electrode when the first electrode is in a disk shape) is a maximum width of each component arranged between the first electrode and the rear cover (maximum width along the direction orthogonal to the reference axis, corresponding to an outer diameter of each component when the components are in disk shapes). By making the maximum width of the first electrode larger than that of other components, the components positioned between the first electrode and the rear cover can be easily arranged without projecting in a radial direction (matching with the direction orthogonal to the reference axis) from the side wall of the first electrode.

In the charged-particle detecting apparatus according to the present invention, the rear cover may have a cylindrical portion projecting toward the first electrode, or the first electrode may have a side wall projecting toward the rear cover. When the cylindrical portion is provided on the rear cover, the cylindrical portion functions so as to house components positioned between the first electrode and the rear cover inside. Also, when the side wall is provided on the first electrode, the side wall functions so as to house components positioned between the first electrode and the rear cover in its internal space. In this construction, the components can be easily arranged without projecting in the radial direction from the side wall of the first electrode, and the components can be electromagnetically shielded.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

Figure 1:
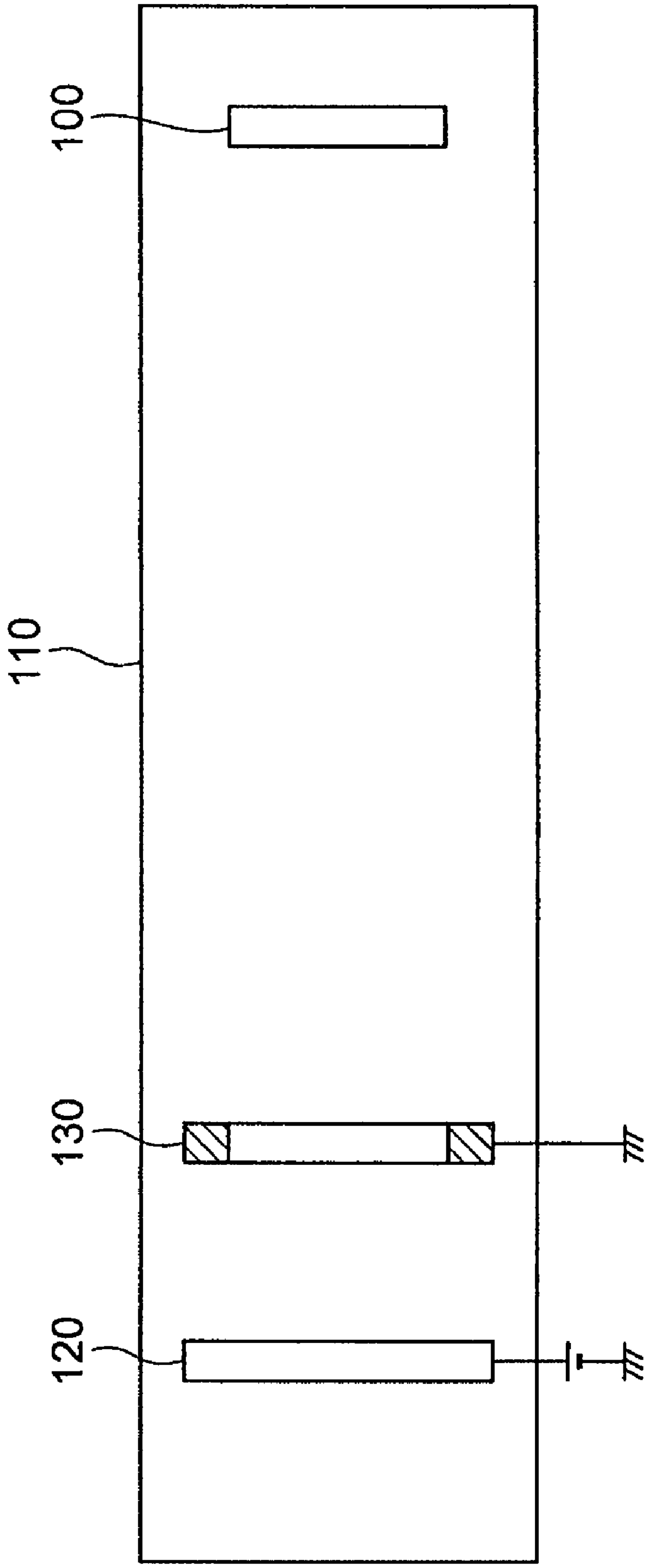
FIG. 1 is a drawing for explaining the TOF-MS.
Figure 2:
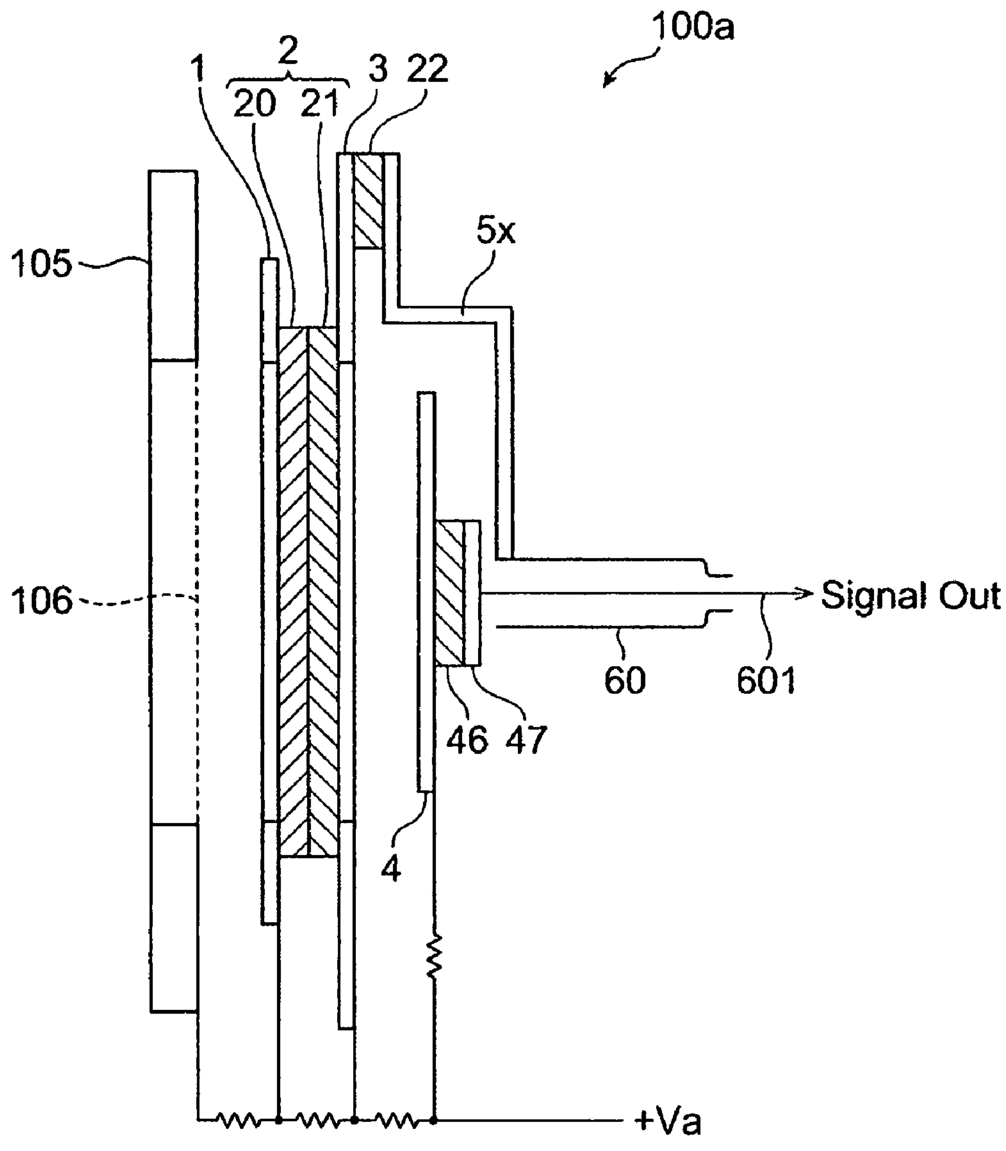
FIG. 2 is a schematic cross-sectional view showing an example of a detector to be applied to the TOF-MS.

In the following, embodiments of the charged-particle detecting apparatus according to the present invention will be explained in detail with reference to FIGS. 3 to 11, 12A to 16B, 17 to 21, 22A to 22B, 23, 24A to 24B, 25, and 26A to 26B. In the description of the drawings, identical or corresponding components are designated by the same reference numerals, and overlapping description is omitted.

Figure 3:
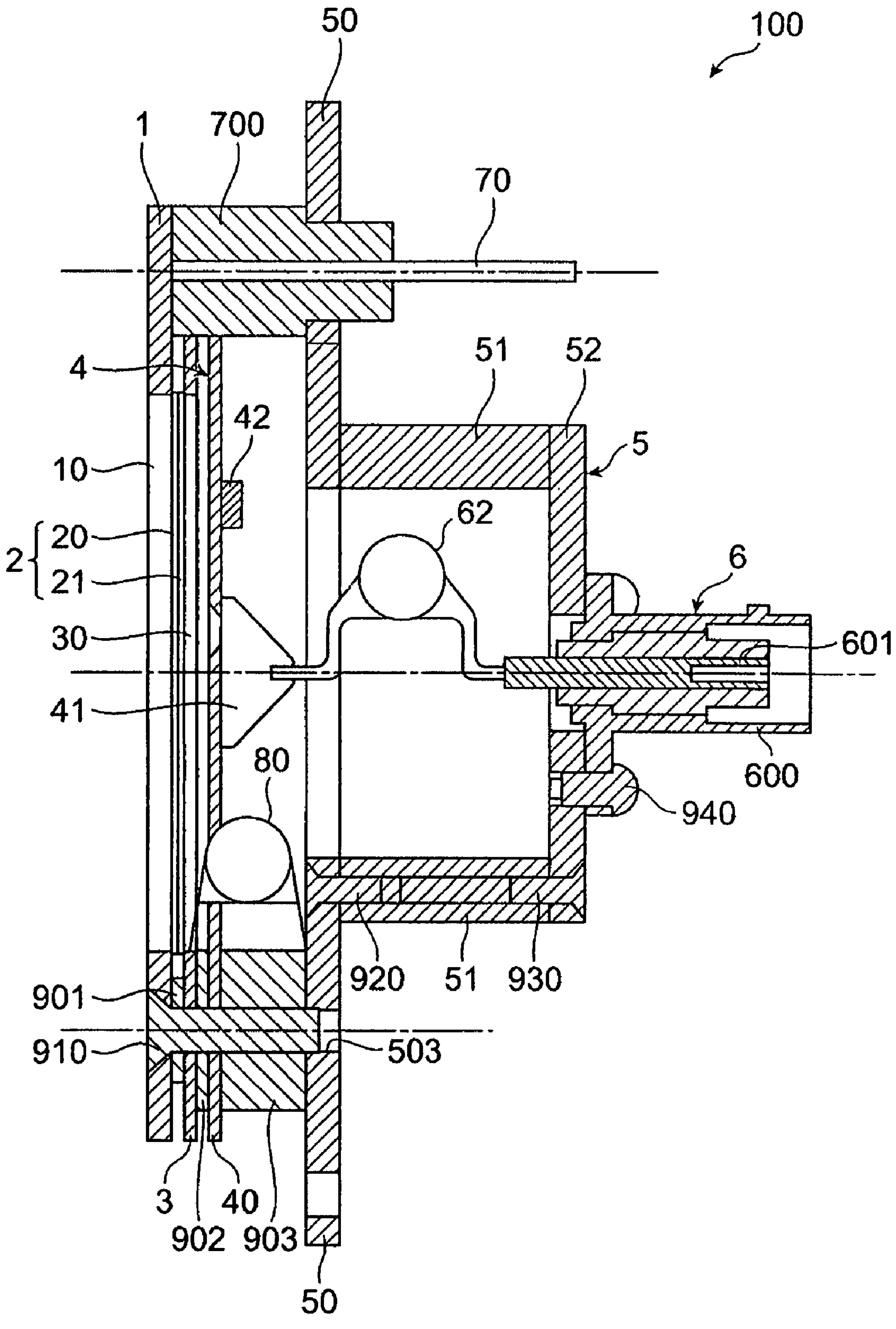
FIG. 3 is a cross-sectional view showing a construction of a first embodiment of a charged-particle detecting apparatus according to the present invention.
Figure 4:
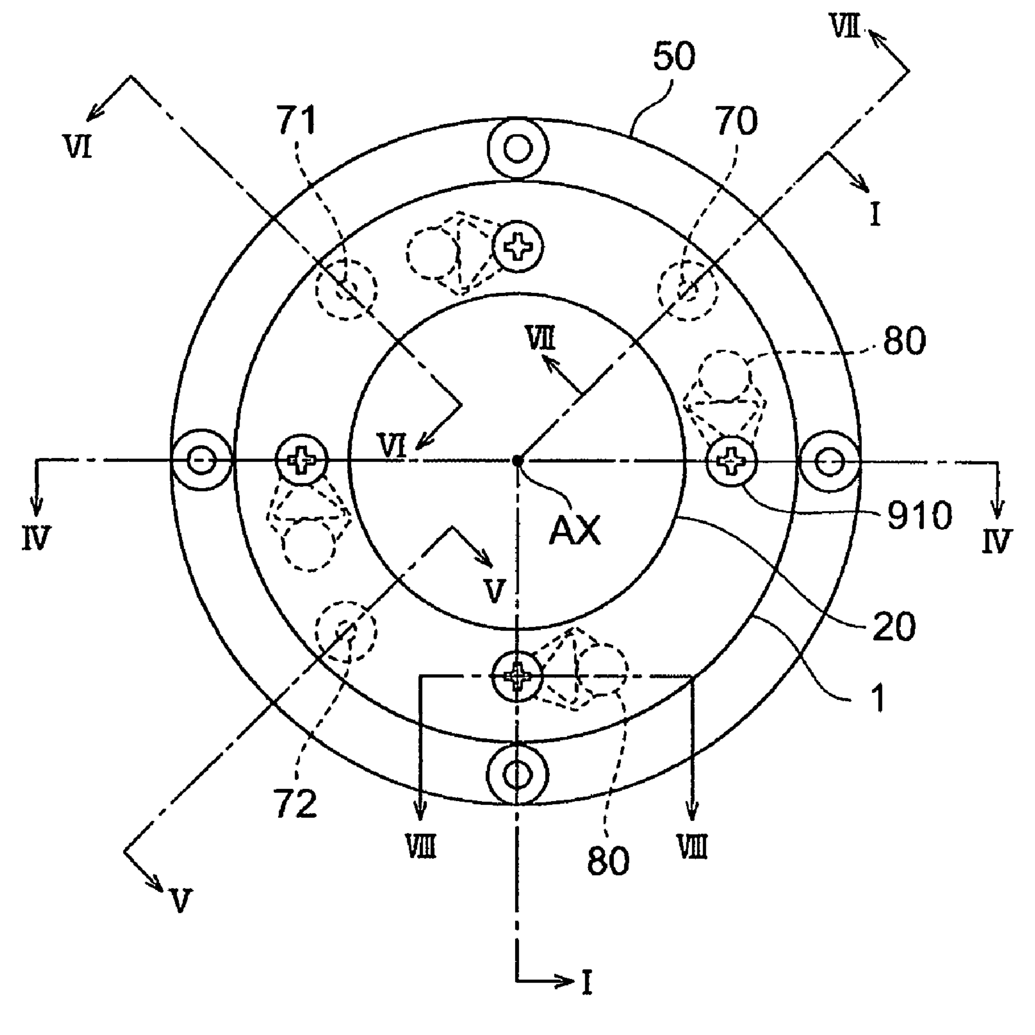
FIG. 4 is a front view of the charged-particle detecting apparatus of the first embodiment shown in FIG. 3.
Figure 5:
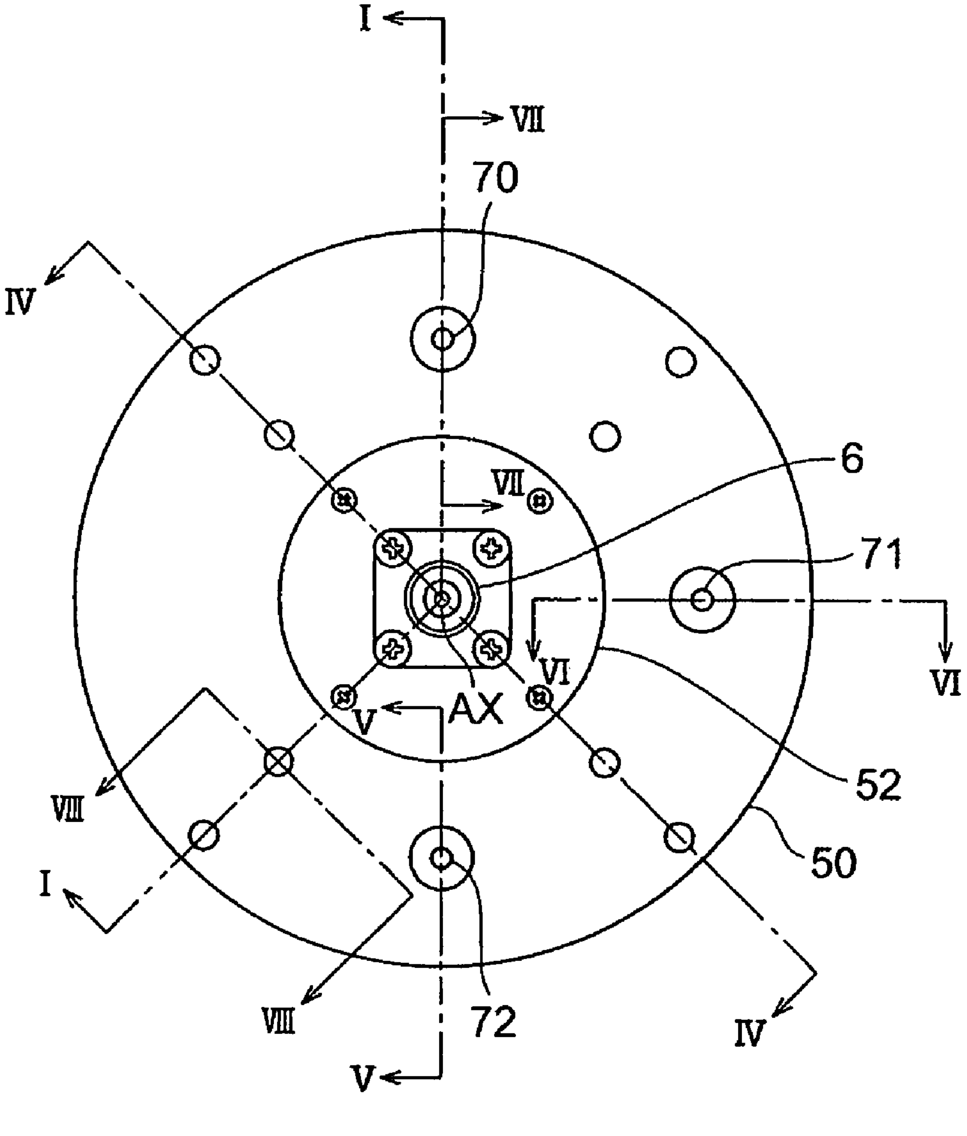
FIG. 5 is a back view of the charged-particle detecting apparatus of the first embodiment shown in FIG. 3.
Figure 6:
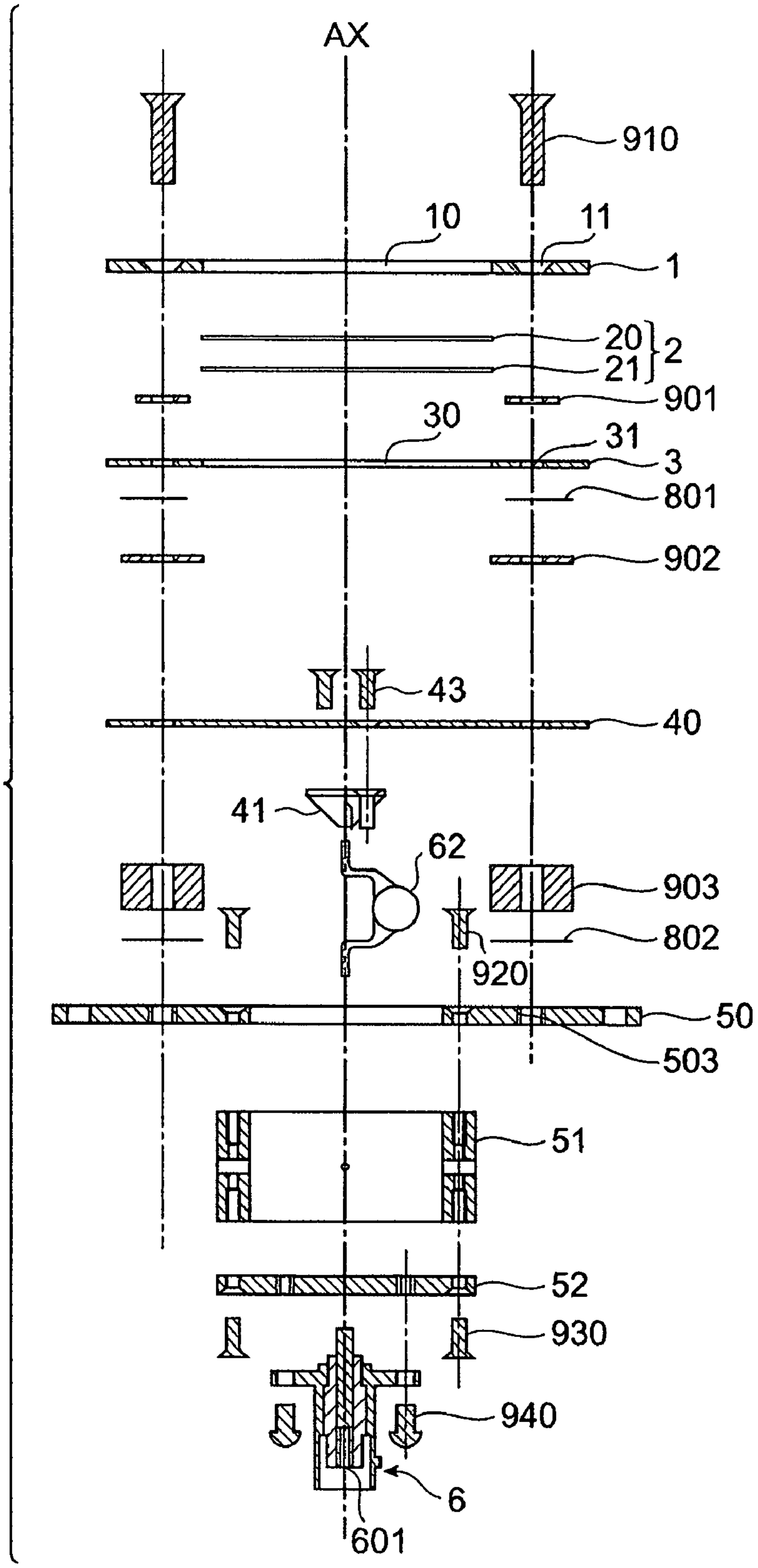
FIG. 6 is an exploded cross-sectional view of the charged-particle detecting apparatus of the first embodiment along the IV-IV line of FIGS. 4 and 5.
Figure 7:
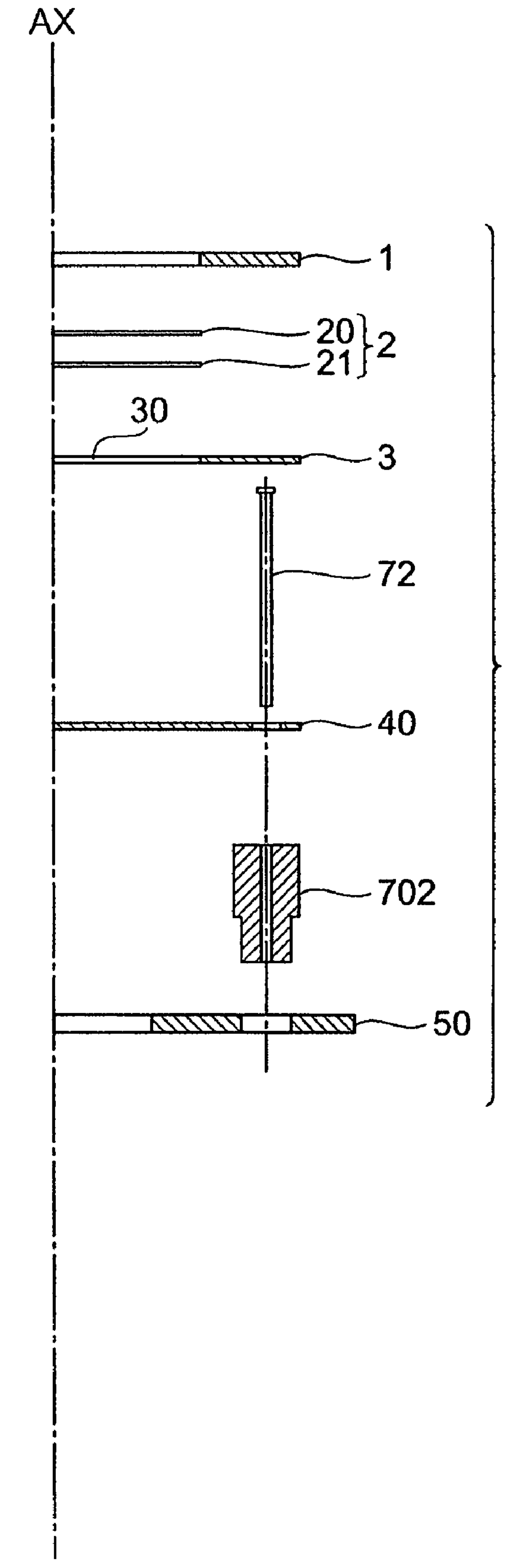
FIG. 7 is an exploded cross-sectional view of the charged-particle detecting apparatus of the first embodiment along the V-V line of FIGS. 4 and 5.
Figure 8:
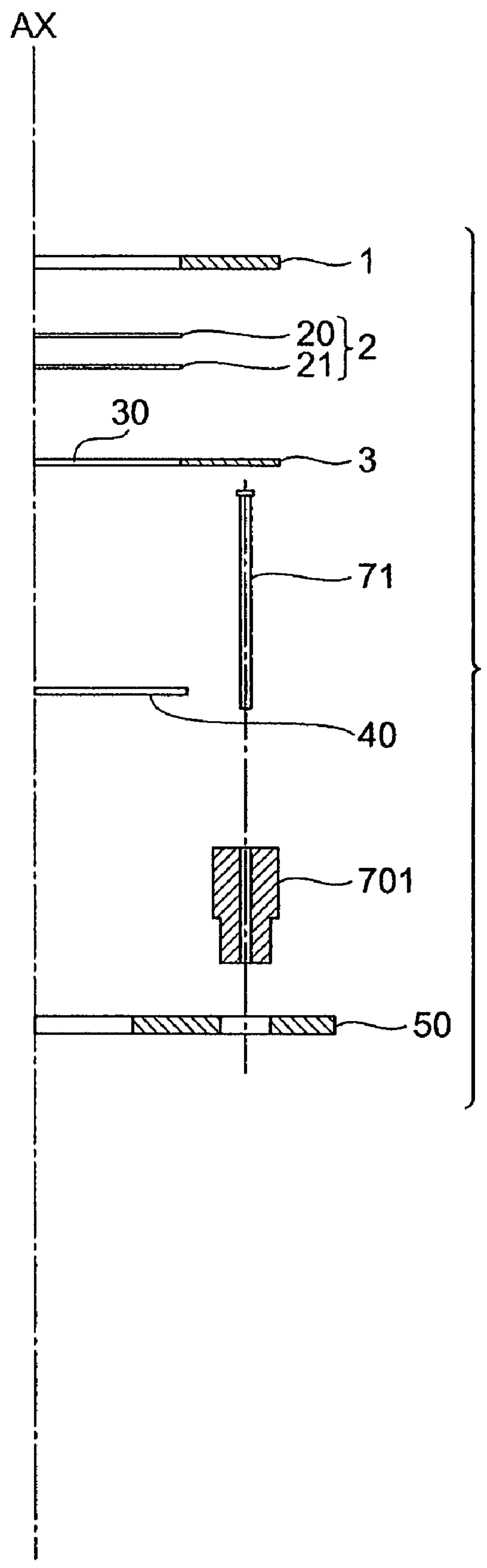
FIG. 8 is an exploded cross-sectional view of the charged-particle detecting apparatus of the first embodiment along the VI-VI line of FIGS. 4 and 5.
Figure 9:
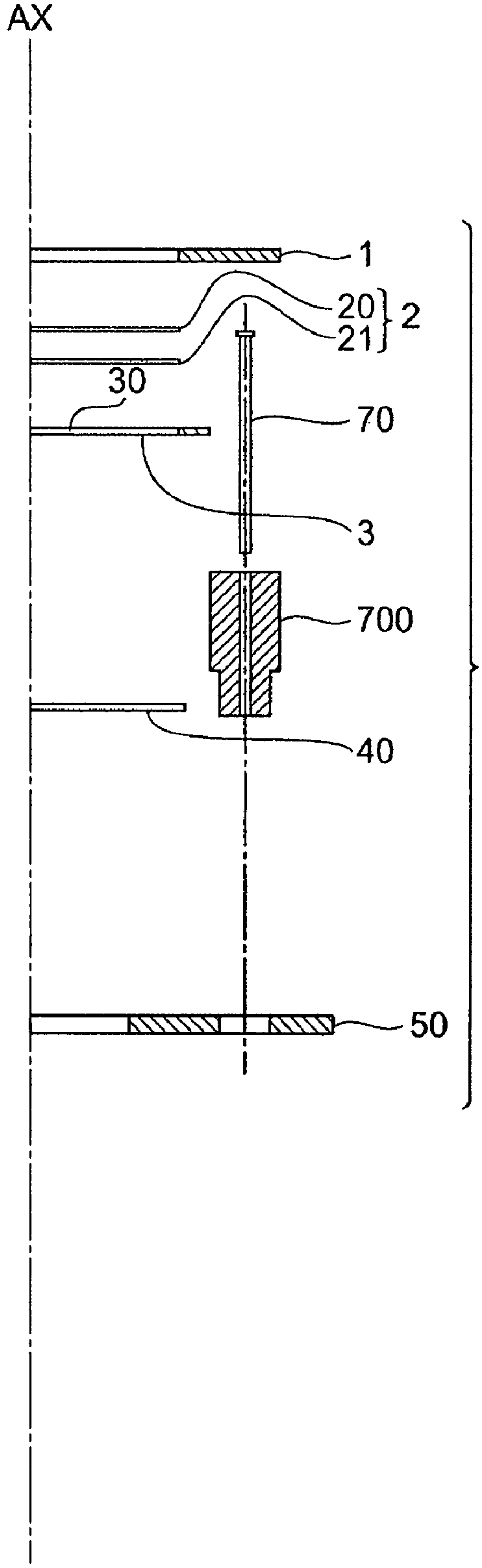
FIG. 9 is an exploded cross-sectional view of the charged-particle detecting apparatus of the first embodiment along the VII-VII line of FIGS. 4 and 5.
Figure 10:
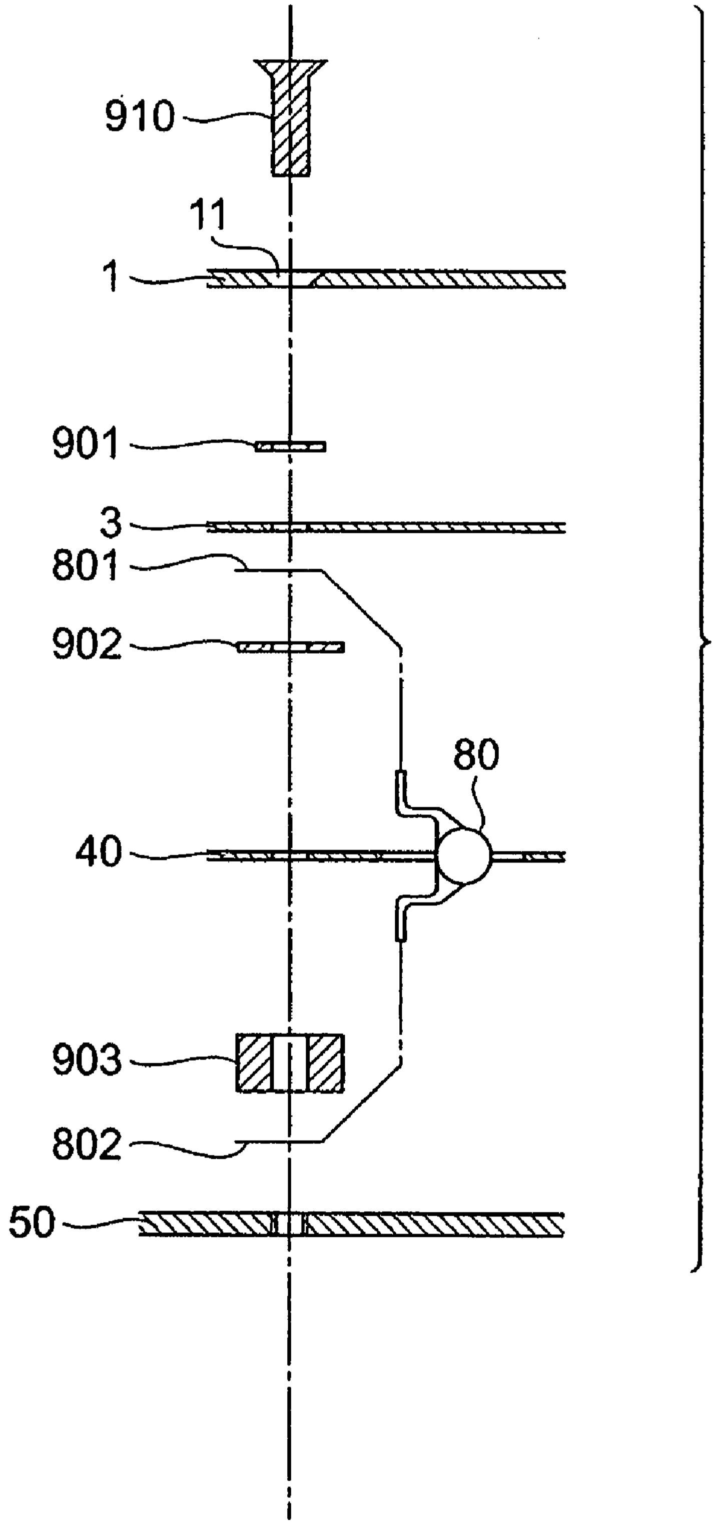
FIG. 10 is an exploded cross-sectional view of the charged-particle detecting apparatus of the first embodiment along the VIII-VIII line of FIGS. 4 and 5.

FIG. 3 is a cross-sectional view showing a construction of a first embodiment of the charged-particle detecting apparatus according to the present invention. FIGS. 4 and 5 are a front view and a back view of the charged-particle detecting apparatus of the first embodiment shown in FIG. 3. Furthermore, FIGS. 6 to 10 are exploded cross-sectional views of the charged-particle detecting apparatus of the first embodiment along the IV-IV line, V-V line, VI-VI line, VII-VII line, and VIII-VIII line of FIGS. 4 and 5, respectively.

The charged-particle detecting apparatus 100 of the first embodiment has a structure including an IN electrode 1 (first electrode), an MCP group 2, an OUT electrode 3 (second electrode), and an anode electrode 4 (third electrode) arranged in order along a tube axis AX (reference axis). The MCP group 2 is constituted by two disk-shaped MCPs 20 and 21. This MCP group 2 is arranged so that the IN electrode 1 (first electrode) is arranged on an incidence surface (front surface which charged particles arrive at) side of the MCP group, and on the other hand, the OUT electrode (second electrode) 3 is arranged on an exit surface (rear surface) side, whereby the MCP group is sandwiched by the IN electrode 1 and the OUT electrode 3.

The IN electrode 1 is a metal electrode (for example, stainless steel) in a donut shape having an opening 10 at its center, and in its disk surface, holes 11 into which four flat head screws 910 are inserted are formed every 90 degrees around the tube axis AX. To the rear surface of the IN electrode 1, an IN lead 70 having a rod shape comprised of a conductive material (for example, stainless steel) extending from the rear side is electrically connected. The connecting position between the IN electrode 1 and the IN lead 70 is midway between two adjacent holes 11. The IN lead 70 is retained while being inserted in an IN lead insulator 700 comprised of an insulating material, and due to this construction, the IN lead 70 is insulated from other components. As the IN lead insulator 700, for example, PEEK (PolyEtherEtherKetone) excellent in workability, heat resistance, impact resistance, and insulation performance is suitable.

The OUT electrode 3 is also a metal electrode in a donut shape having an opening 30 at its center similarly to the IN electrode 1, however, it has a structure partially cut away so as not to come into contact with the IN lead insulator 700 housing the IN lead 70. In the disk surface of the OUT electrode 3, at positions corresponding to the holes 11 of the IN electrode 1, similar holes 31 are formed. To the rear surface of the OUT electrode 3, an OUT lead 71 comprised of a conductive material (for example, stainless steel) in a rod shape extending from the rear side is electrically connected. The OUT lead 71 is arranged at a position rotated counterclockwise by 90 degrees around the tube axis AX from the IN lead 70 viewed from the front. This OUT lead 71 is retained while also being inserted in an OUT lead insulator 701 comprised of an insulating material such as a PEEK resin similarly to the IN lead 70 (insulated from other components).

At positions corresponding to the holes 11 and 31 between the IN electrode 1 and the OUT electrode 3, MCP insulators 901 in a donut shape comprised of an insulating material are arranged, respectively. These MCP insulators 901 are comprised of, for example, a PEEK resin, and their thicknesses are slightly smaller than that of the MCP group 2. The above-described structure in which the MCP group 2 is sandwiched between the IN electrode I and the OUT electrode 3 is obtained by accurate assembly so that the centers of the MCPs 20 and 21 in disk shapes match with the centers of the openings 10 and 30 of the IN electrode 1 and the OUT electrode 3.

Behind the OUT electrode 3, an anode substrate 40 is arranged at a predetermined distance. This anode substrate 40 has a disk shape molded from a glass epoxy resin, and on its front surface and back surface, predetermined patterns of metal thin films comprised of copper or the like are formed. The metal thin film pattern on the front surface and the metal thin film pattern on the back surface are made to conduct to each other. The anode substrate 40 has a notched structure so as not to come into contact with the IN lead insulator 700 housing the IN lead 70 and the OUT lead insulator 701 housing the OUT lead 71. As described above, the anode substrate 40 is arranged at a predetermined distance from the OUT electrode 3, so that at positions on the anode substrate 40 corresponding to the holes 11 and 31, holes are formed, and between the anode substrate and the OUT electrode 3, thin plates 801 in a donut shape comprised of a conductive material and insulators 902 comprised of an insulating material are arranged. As the thin plates 801, a material excellent in ductility is suitable, and for example, a member obtained by plating gold or copper on a phosphor bronze plate is preferable. As the insulators 902, for example, a PEEK resin is applicable.

Of the metal thin film patterns formed on the front surface and the back surface of the anode substrate 40, respectively, the metal thin film pattern on the front surface is in a circular shape matching with the opening 30 of the OUT electrode 3, and the opening 30 and the metal thin film pattern on the front surface are arranged coaxially. On the other hand, the metal thin film pattern on the back surface is an almost linear pattern extending to one side of a diameter direction from the center of the anode substrate 40, and to its outer end, an anode lead 72 comprised of a conductive material (for example, stainless steel) in a rod shape extending from the rear side is electrically connected. The anode lead 72 is arranged at a position rotated counterclockwise by 90 degrees around the tube axis AX from the OUT lead 71 viewed from the front. That is, the anode lead is arranged at a position symmetrical to the IN lead 70 about the tube axis AX. This anode lead 72 is retained while also being inserted in an anode lead insulator 702 comprised of an insulating material such as a PEEK resin similarly to the IN lead 70 and the OUT lead 71, whereby the anode lead is insulated from other components.

To the center of the metal thin film pattern on the back surface, an anode terminal 41 comprised of copper is connected by screws 43. This anode terminal 41 and the anode substrate 40 constitute the anode electrode (third electrode) 4. On the metal thin film pattern on the back surface, a chip resistor 42 is arranged.

Behind the anode electrode 4, a rear cover 5 is arranged. This rear cover 5 is constituted by a donut-shaped substrate 50, a cylindrical portion 51, and a donut-shaped substrate 52. The cylindrical portion 51 is sandwiched between the substrates 50 and 52 and fixed by screws 920 and 930, and the rear cover 5 is formed into a deep-dish-shaped member by connecting the inner periphery of the substrate 50 and the outer periphery of the substrate 52 via the cylindrical portion 51. The substrates 50 and 52 and the cylindrical portion 51 are all comprised of metal (for example, stainless steel). In the substrate 50, a screw hole 503 is formed, and the rear cover 5 is arranged on the back surface of the anode electrode 4 so as to sandwich the insulators 903 and the thin plates 802 therebetween. At this time, by tightening the screws 910 into the screw hole 503, the electrodes 1, 3, and 4 and the MCP group 2 are fixed to the rear cover 5. The thin plates 802 may be comprised of the same material as that of the thin plates 801. As the insulators 903, for example, a PEEK resin is applicable. The substrate 50 has holes into which the lead insulators 700 and 702 are inserted, respectively.

At the center of the substrate 52, a BNC terminal 6 as a signal output part is fixed by screws 940. The outer side 600 of the BNC terminal 6 is electrically connected to the substrate 50 of the rear cover 5. On the other hand, a core 601 inside the BNC terminal 6 is connected to the anode terminal 41 via a capacitor (first capacitor) 62. This capacitor 62 has a function of adjusting a signal output level to the GND level by insulating the output.

On the other hand, between the above-described thin plate 801 and thin plate 802, capacitors (second capacitors) 80 are arranged. Four capacitors 80 in total are attached at equal intervals around the tube axis AX. These capacitors 80 are attached between the substrate 50 and the OUT electrode 3. The substrate 50, the cylindrical portion 51, and the substrate 52 are comprised of metal, so that one ends of the capacitors 80 are electrically connected to the outer side of the BNC terminal 6.

Herein, excluding the region facing the MCP group 2, the surface of the IN electrode 1 (surface opposing the facing region and side surface) is entirely exposed. Among components positioned between the IN electrode 1 and the rear cover 5, at least the MCP group 2, the OUT electrode 3, and the anode electrode 4 are all smaller in outer diameter than the IN electrode 1, and other electronic parts (capacitors 62 and 80, etc.) are also arranged so as to be positioned further inward than the side wall of the IN electrode 1 when viewed from the front side (IN electrode 1 side, in the charged particle incidence direction). Among the components, only the substrate 50 of the rear cover 5 projects outward (diameter direction of the first electrode 1) from the side surface of the IN electrode 1.

Figure 11:
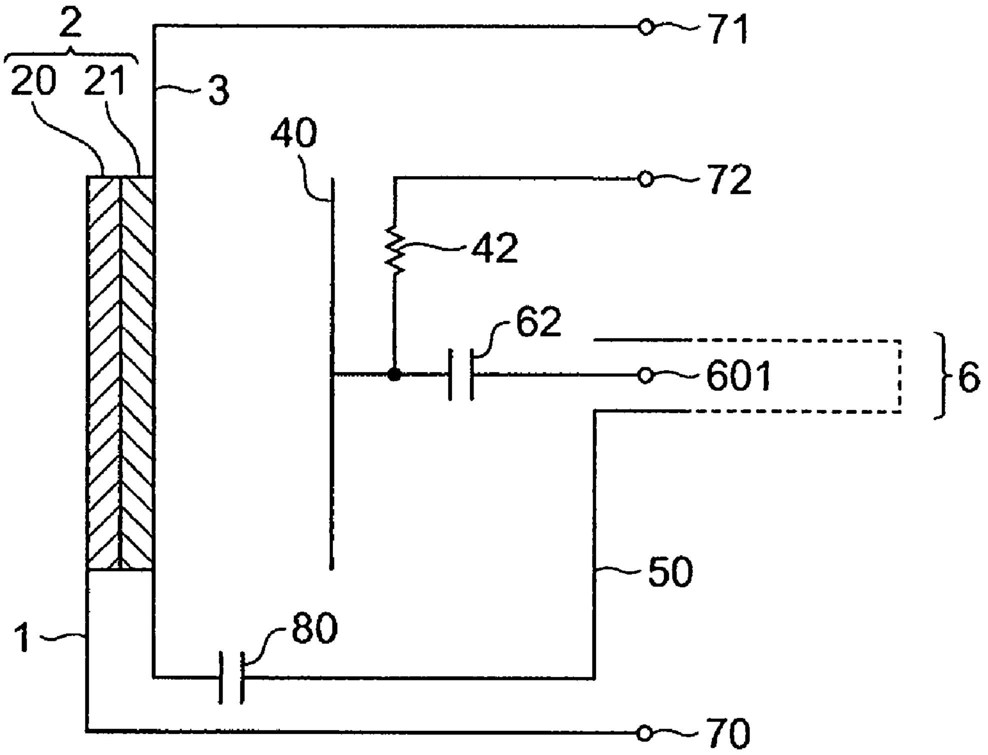
FIG. 11 is an equivalent circuit diagram of the charged-particle detecting apparatus of the first embodiment shown in FIGS. 3 to 10.

FIG. 11 is an equivalent circuit diagram of the charged-particle detecting apparatus 100 of the first embodiment. At the time of measurement, both the core 601 side and outer side 600 of the BNC terminal 6 are set to the ground potential. When measuring anion, positive voltages are applied to the leads 70 through 72. At this time, the voltages $V_1$ through $V_3$ to be supplied to the leads 70 through 72 satisfy the relationship of $0<V_1<V_2<V_3$. On the contrary, when measuring cation, negative voltages are applied to the leads 70 through 72. At this time, the voltages V1 through $V_3$ to be supplied to the leads 70 through 72 satisfy the relationship of $V_1<V_2<V_3<0$. The potential difference $(V_2-V_1)$ and the potential difference $(V_3-V_2)$ are set to the same value between the time of measurement of anion and the time of measurement of cation.

Figure 12A:
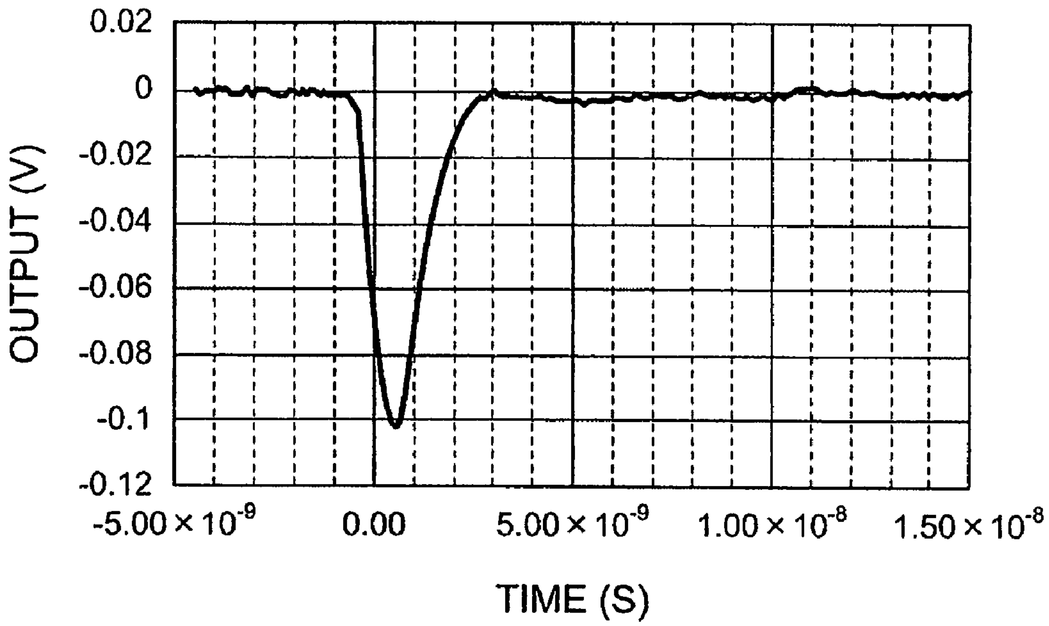
FIG. 12A is an output signal waveform of the charged-particle detecting apparatus of the first embodiment shown in FIGS. 3 to 11.
Figure 12B:
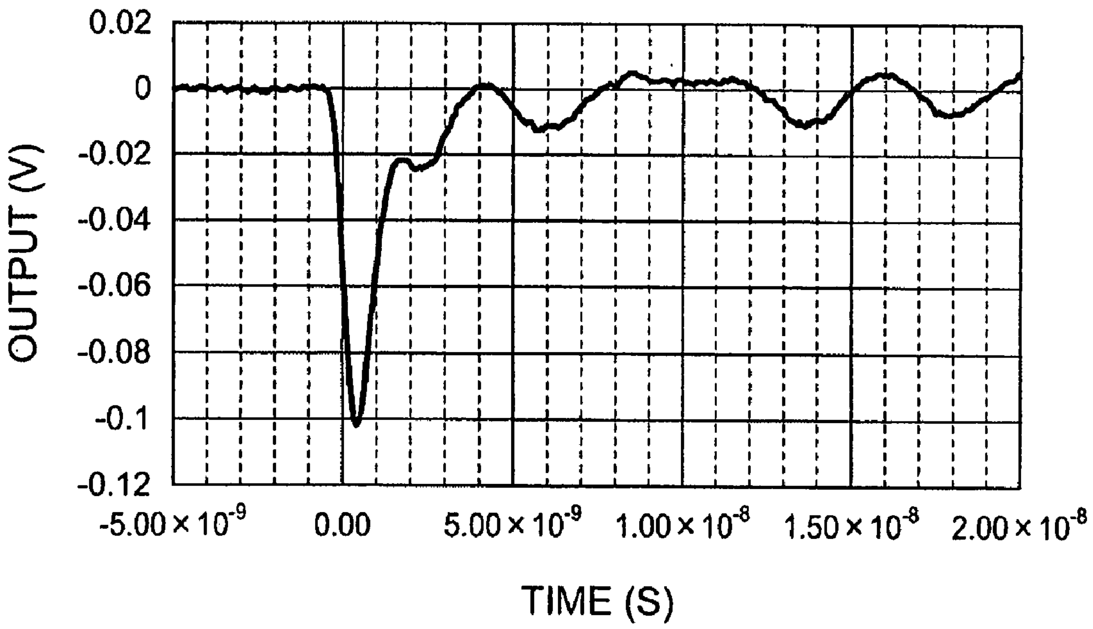
FIG. 12B is an output signal waveform of a detector of a comparative example.

FIGS. 12A and 12B show output waveforms obtained when detection is performed by the charged-particle detecting apparatus 100 of the first embodiment and by a conventional detector as a comparative example. In particular, FIG. 12A shows an output signal waveform at the time of detection of anion by the charged-particle detecting apparatus 100, and FIG. 12B shows an output signal waveform at the time of detection of anion by a conventional detector. As shown in FIG. 12B, in the case of the conventional detector, ringing occurs at the portion A. However, according to the charged-particle detecting apparatus, as seen in FIG. 12A, occurrence of ringing is suppressed (waveform distortion is suppressed). For ringing suppression, arrangement of a capacitor has been conventionally performed, and the ringing suppressing capacitor is also arranged in the conventional detector of the comparative example. However, according to the charged-particle detecting apparatus 100, the capacitor 62 arranged on the signal output line and the capacitors 80 arranged between the OUT electrode 3 and the shield line are arranged close to the electrode, so that due to the reactance of the electrode, the capacitor effect is not deteriorated, and a sufficient ringing suppression effect is obtained.

Figure 13A:
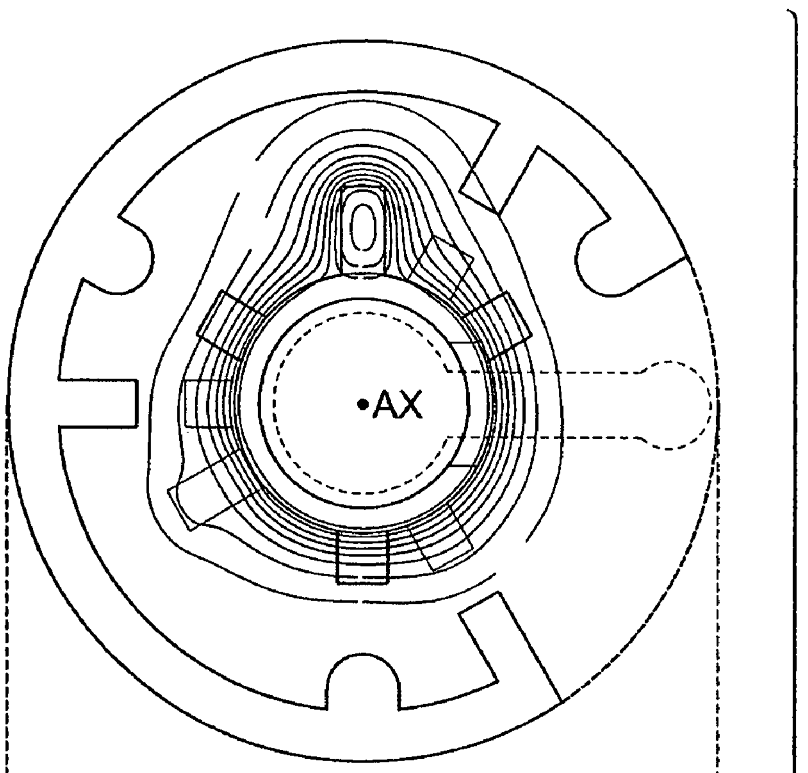
FIGS. 13A and 13B are a plan view and a front view of the detector of the comparative example, showing a potential distribution formed when detecting cation.
Figure 14A:
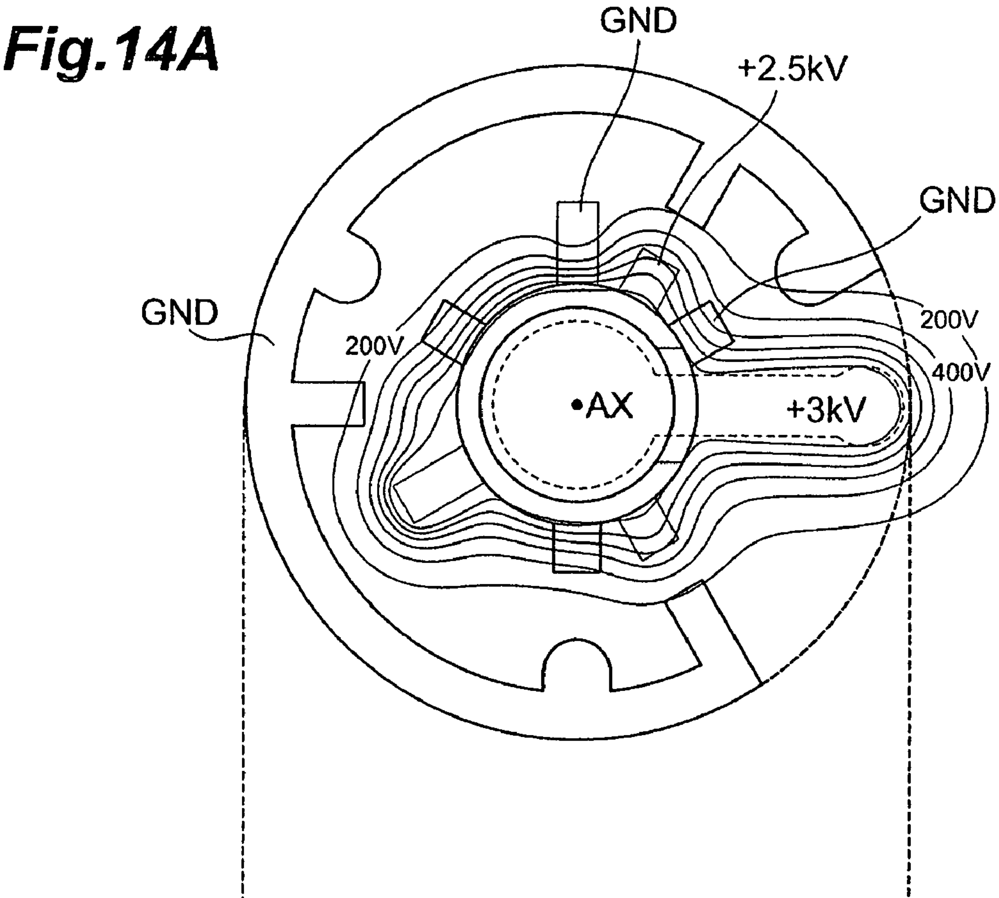
FIGS. 14A and 14B are a plan view and a front view of the detector of the comparative example, showing a potential distribution formed when detecting anion.
Figure 14B:
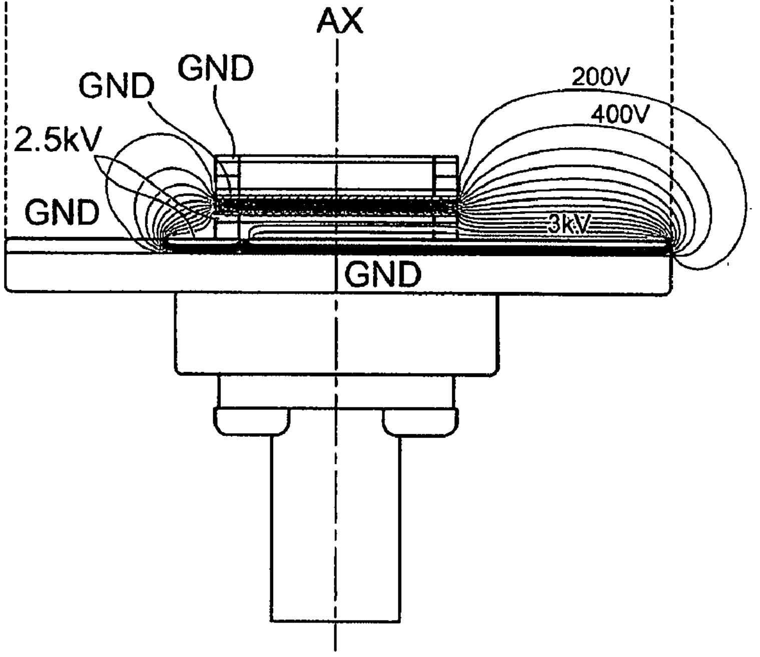
Figure 15A:
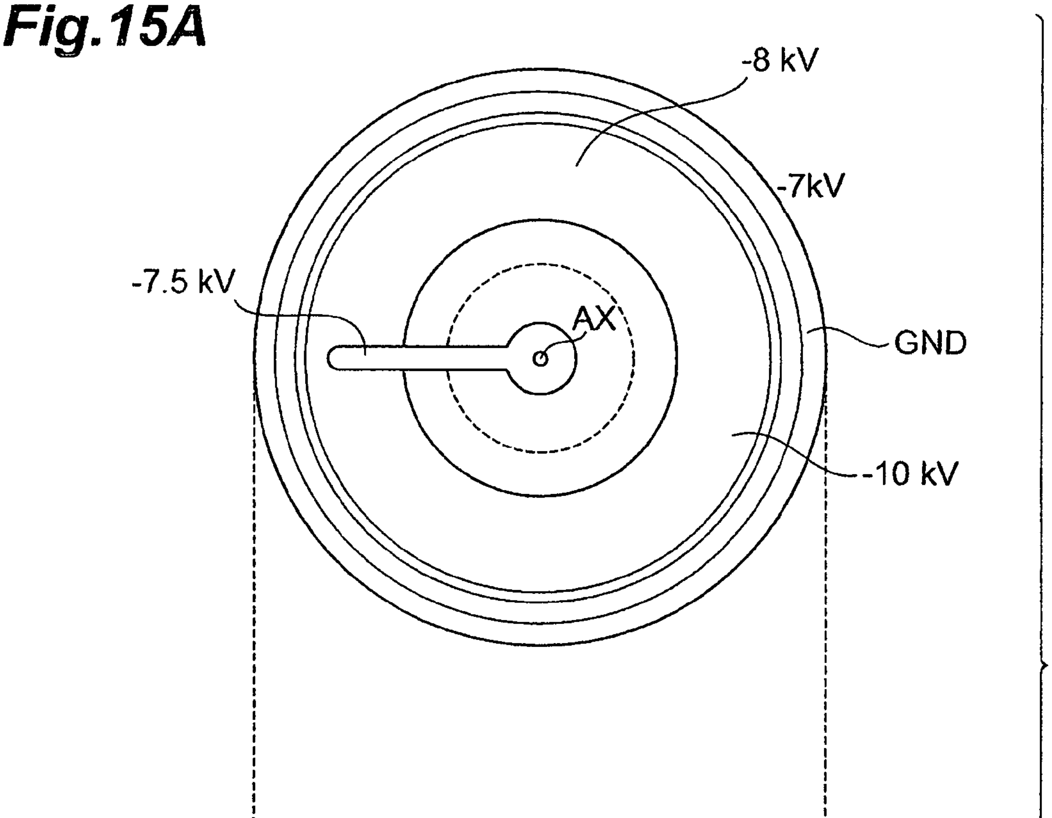
FIGS. 15A and 15B are a plan view and a front view of the charged-particle detecting apparatus of the first embodiment, showing a potential distribution formed when detecting cation.
Figure 15B:
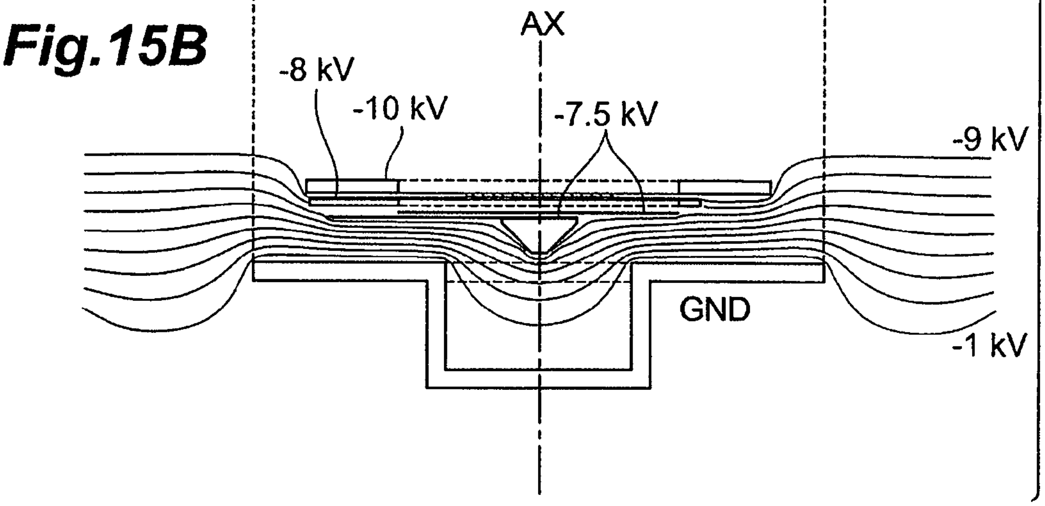
Figure 16A:
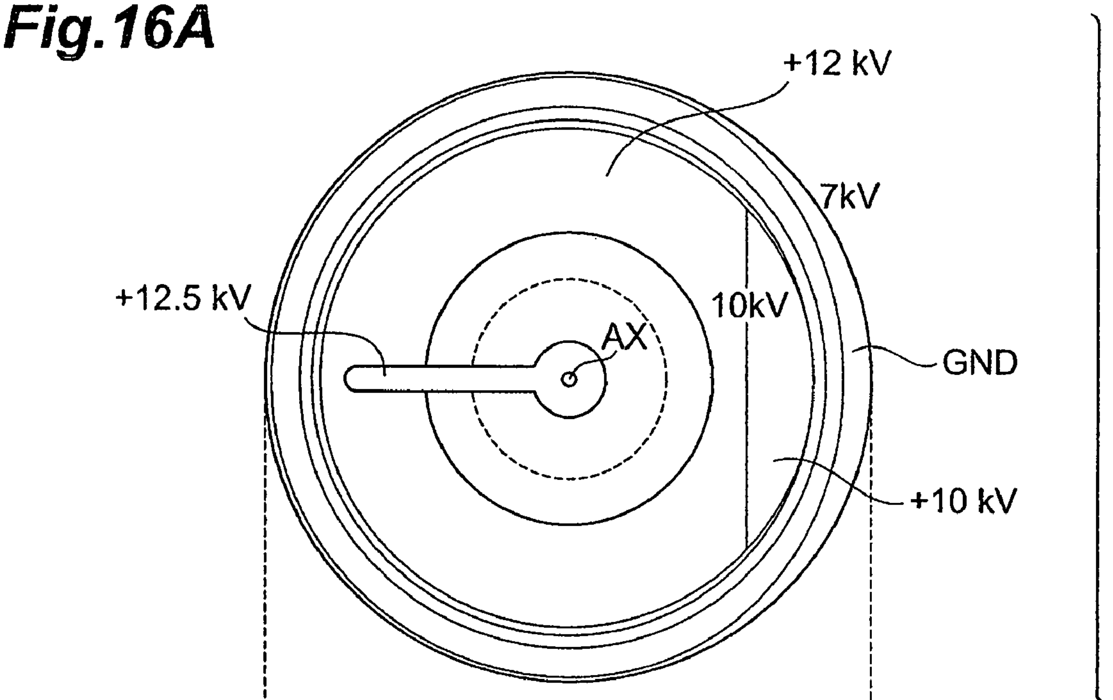
FIGS. 16A and 16B are a plan view and a front view of the charged-particle detecting apparatus of the first embodiment, showing a potential distribution formed when detecting anion, and showing an electric field.
Figure 16B:
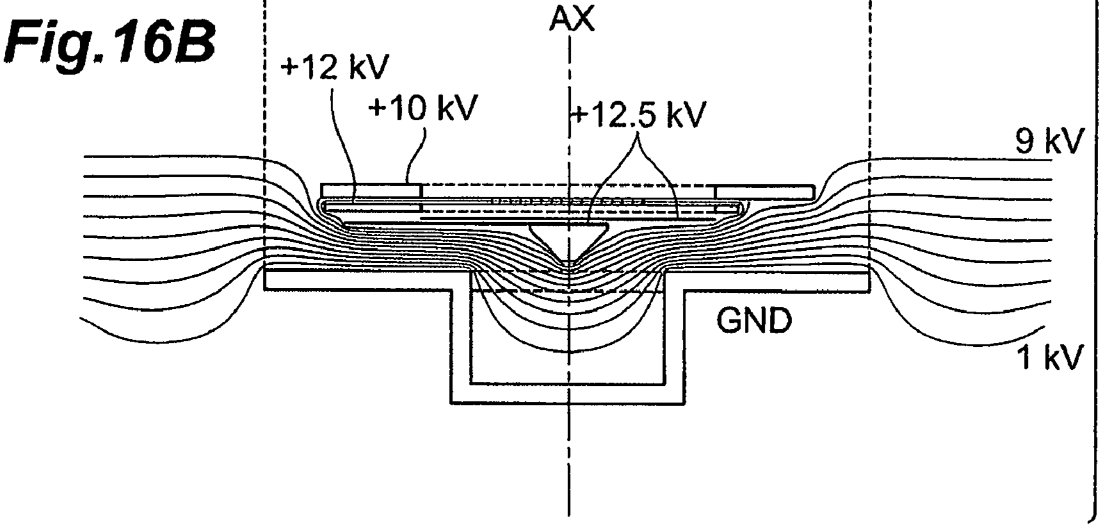

FIGS. 13A to 16B show potential distributions to be formed in the conventional detector of the comparative example and the charged-particle detecting apparatus 100. That is, FIGS. 13A and 13B are a plan view and a front view of the conventional detector of the comparative example, showing a potential distribution formed at the time of cation detection. FIGS. 14A and 14B are a plan view and a front view of the conventional detector of the comparative example, showing a potential distribution formed at the time of anion detection. FIGS. 15A and 15B are a plan view and a front view of the charged-particle detecting apparatus of the first embodiment, showing a potential distribution formed at the time of cation detection. FIGS. 16A and 16B are a plan view and a front view of the charged-particle detecting apparatus of the first embodiment, showing a potential distribution formed at the time of anion detection.

Figure 13B:
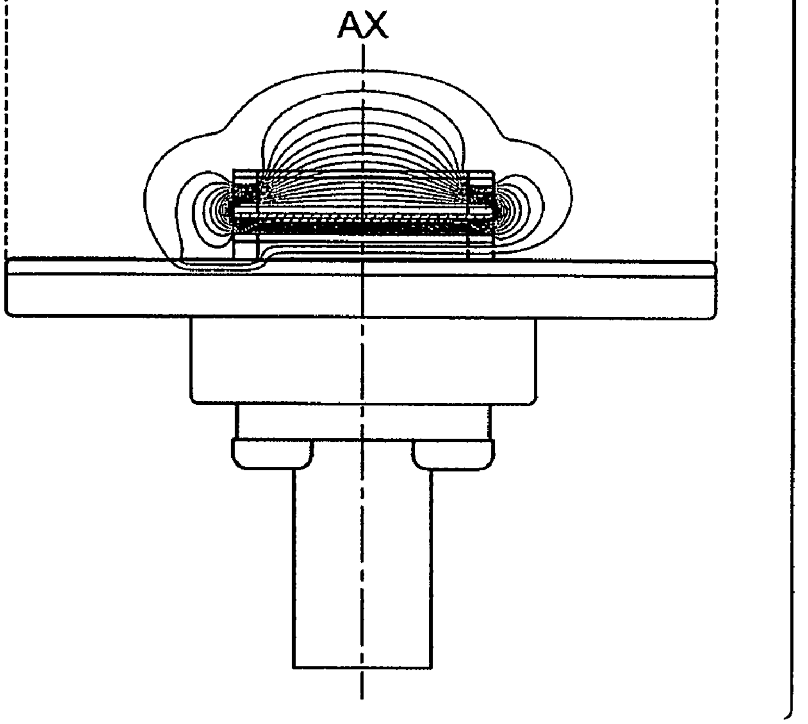

According to the conventional detector of the comparative example, the difference between the potential distribution formed at the time of cation detection shown in FIGS. 13A and 13B and the potential distribution formed at the time of anion detection shown in FIGS. 14A and 14B is sharp. The loci of ions that came flying to the detector are influenced by the electric field in the flight space, so that the flight loci of the ions depend on the state of a formed potential distribution. As understood from the comparison between FIGS. 13A and 13B and FIGS. 14A and 14B, due to the difference in potential distribution between cation detection and anion detection, the influence on the loci of coming ions differs. As a result, in the conventional detector, the loci of coming ions near the detection surface become different. In other words, the detection performance of the conventional detector greatly differs between cation detection and anion detection.

On the other hand, according to the charged-particle detecting apparatus 100, the potential distribution at the time of cation detection shown in FIGS. 15A and 15B and the potential distribution at the time of anion detection shown in FIGS. 16A and 16B substantially match each other. As a result, the influence from the formed potential distribution on ions that came flying toward the detector can be substantially equal between cation detection and anion detection, so that the detection performance of the charged-particle detecting apparatus 100 also becomes substantially equivalent between cation detection and anion detection.

The conventional detector of the comparative example has a grounded portion on the forefront face, so that the form of the electric field to leak to the side or front side differs depending on the rear side potential. This is considered as a cause of the influence on the flight loci of ions. On the other hand, in the charged-particle detecting apparatus 100, the entire surface of the IN electrode 1, excluding the region facing the MCP group 2, is exposed so that the other electrodes 3 and 4 do not project in a diameter direction more than the side wall of the IN electrode 1 positioned forefront. In this structure, sideward or forward leakage and disturbance of the electric field of the IN electrode 1 are effectively suppressed. Furthermore, the IN electrode 1 is made floating by a high voltage, so that an effect enabling the detection of ions with a high mass number is also obtained.

The ringing suppressing capacitors 80 are also arranged further inward than the side wall of the IN electrode 1, so that without disturbance of the electric field to be formed, the detection efficiency is also improved.

Figure 17:
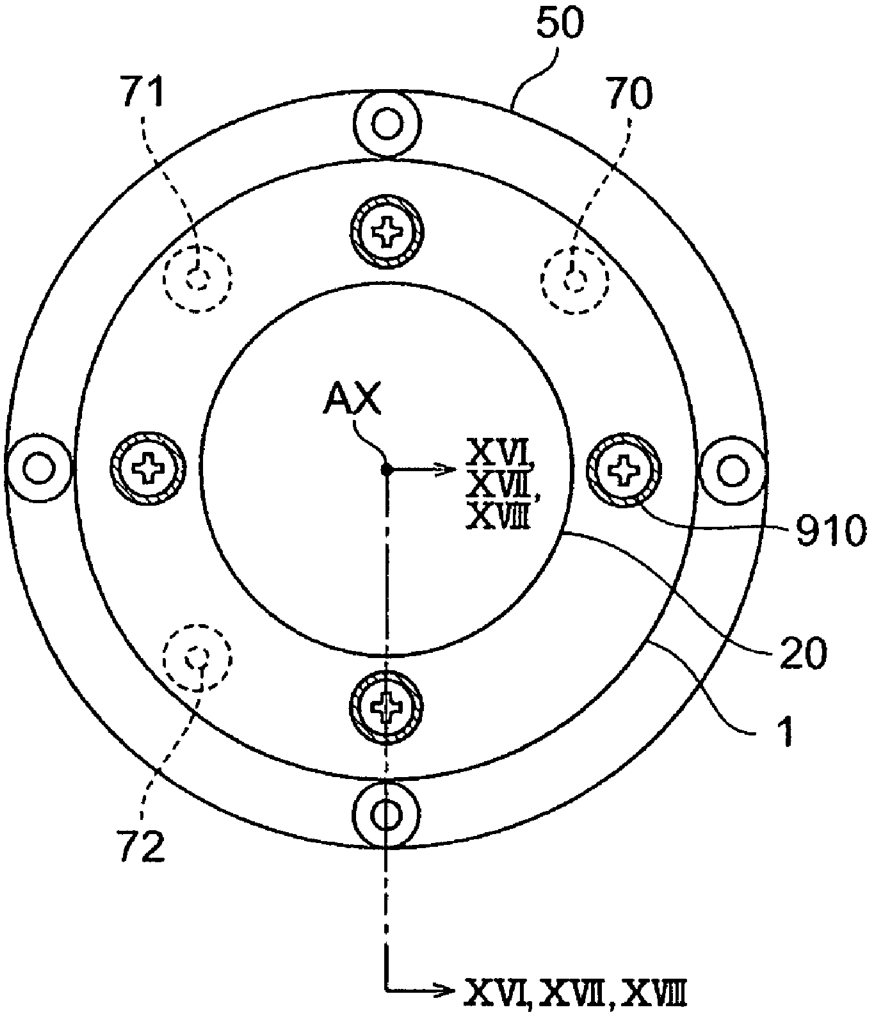
FIG. 17 is a front view showing a construction of a second embodiment of the charged-particle detecting apparatus according to the present invention.
Figure 18:
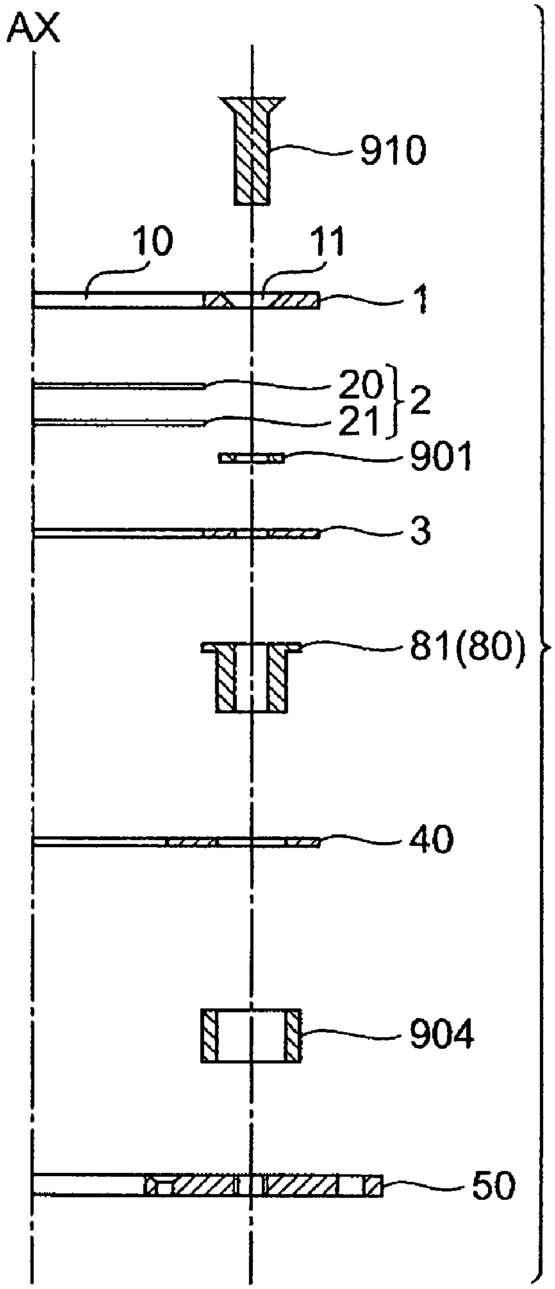
FIG. 18 is a cross-sectional view of the charged-particle detecting apparatus of the second embodiment along the XVI-XVI line of FIG. 17.

FIG. 17 is a front view of a construction of a second embodiment of the charged-particle detecting apparatus according to the present invention. FIG. 18 is a cross-sectional view of the charged-particle detecting apparatus of the second embodiment along the XVI-XVI line of FIG. 17.

The charged-particle detecting apparatus of this second embodiment is different from the first embodiment in that a cylindrical capacitor 81 is applied instead of the capacitors 80 (including the thin plates 801 and 802 as electrodes). The side wall of the cylindrical capacitor 81 is insulated, and on the other hand, both end faces of the capacitor 81 function as electrodes. The capacitor 81 is inserted in a hole of the anode electrode 4 (anode substrate 40) and a hole of an insulator 904 which has a cylindrical shape arranged between the anode electrode 4 and the rear cover 5 and comprised of an insulating material. The capacitor 81 is fixed by screws 910 while its both end faces are in contact with both the OUT electrode 3 and the rear cover 5. Thereby, one end face of the capacitor 81 is electrically connected to the OUT electrode 3, and the other end face is electrically connected to the rear cover 5.

By forming the ringing suppressing capacitor into a cylindrical shape so as to function as a support column, the capacitor can be easily arranged, and the apparatus can be made compact and the manufacturing process can be simplified.

Figure 19:
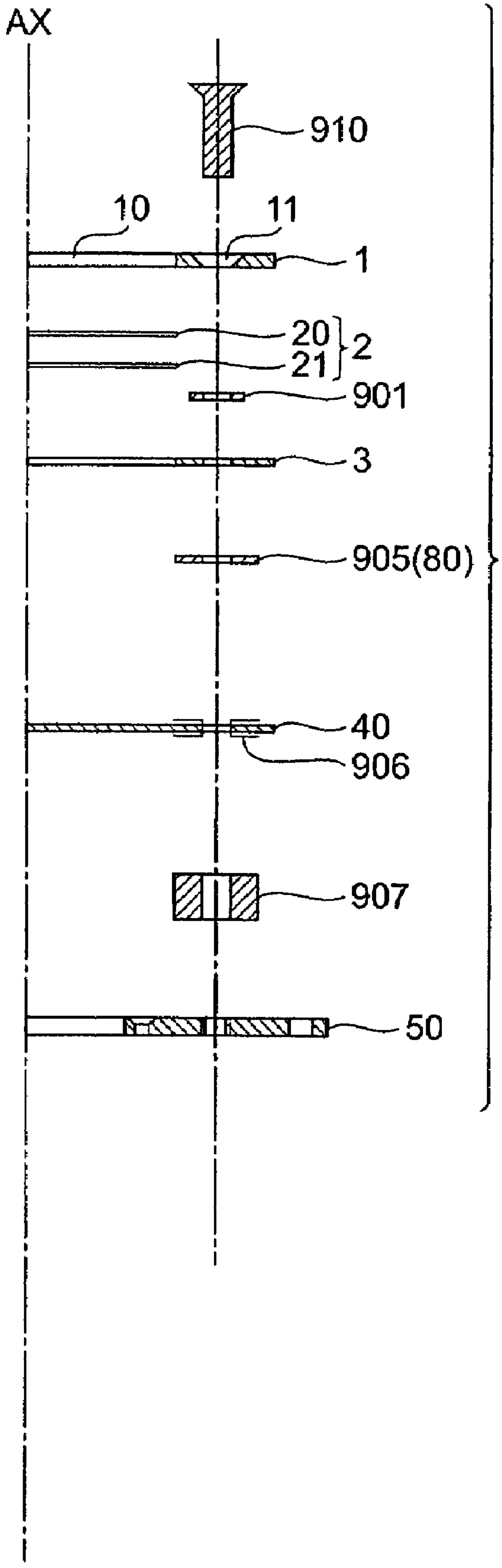
FIG. 19 is a cross-sectional view corresponding to a cross section along the XVII-XVII line of FIG. 17, showing a construction of a first variation of the charged-particle detecting apparatus of the second embodiment.
Figure 20:
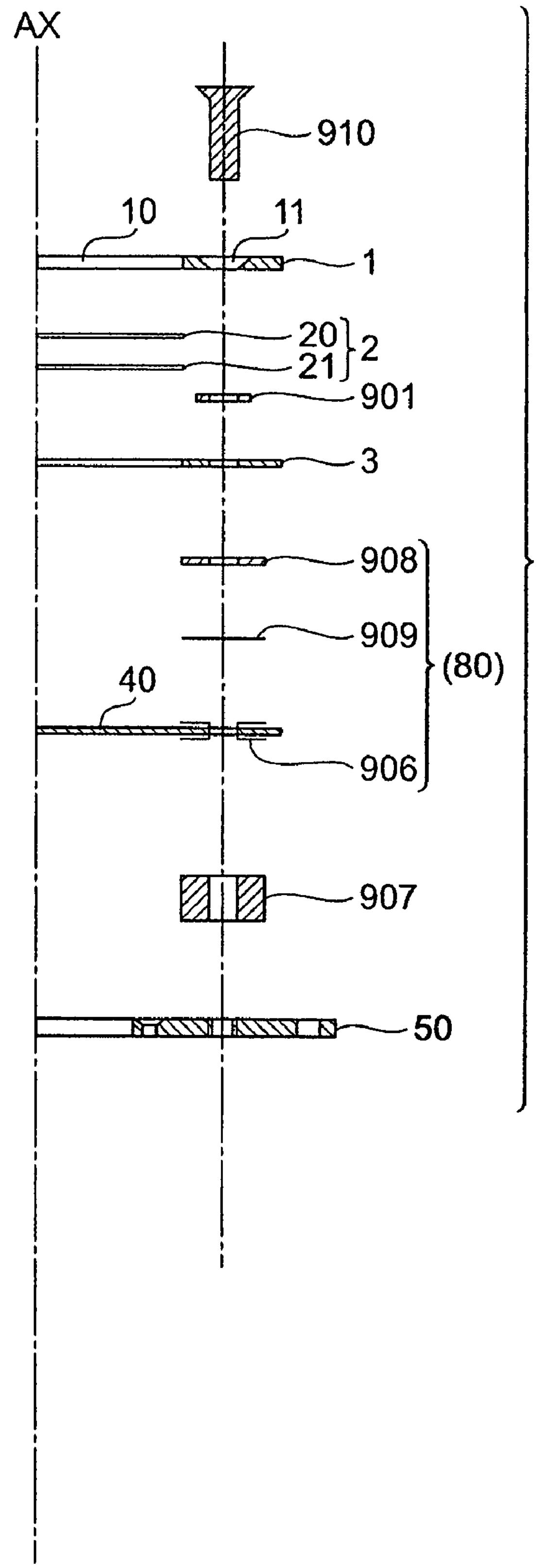
FIG. 20 is a cross-sectional view corresponding to a cross section along the XVIII-XVIII line of FIG. 17, showing a construction of a second variation of the charged-particle detecting apparatus of the second embodiment.

FIGS. 19 and 20 are drawings for explaining variations of the charged-particle detecting apparatus of the second embodiment. In detail, FIG. 19 is a cross-sectional view corresponding to the section along the XVII-XVII line of FIG. 17, showing a construction of a first variation of the charged-particle detecting apparatus of the second embodiment. FIG. 20 is a cross-sectional view corresponding to the section along the XVIII-XVIII line of FIG. 17, showing a construction of a second variation of the charged-particle detecting apparatus of the second embodiment In the charged-particle detecting apparatus of the first variation shown in FIG. 19, a capacitor 905 in a thin cylindrical (disk) shape is applied. In this first variation, to interrupt conduction between the capacitor 905 and the anode electrode 4 (OUT electrode 3 side of the anode substrate 40) and conduction between the anode electrode 4 (rear cover 5 side of the anode substrate 40) and the rear cover 5, and on the other hand, to secure conduction between the capacitor 905 and the rear cover 5, a side directly facing the anode substrate 40 in the hole of the anode substrate 40 is coated with an insulating material, and on the other hand, the other side is provided with a member 906 coated with a conductor (for example, metal foil). In this case, instead of the insulator 904, a cylindrical conductor 907 is arranged between the anode substrate 40 and the rear cover 5. Also in this first variation, the same action and effect as in the second embodiment are obtained.

On the other hand, in the second variation shown in FIG. 20, instead of the capacitor 905 in the first variation shown in FIG. 19, a thin plate 908 comprised of a conductive material and a thin plate 909 comprised of a dielectric material are applied. By sandwiching the thin plate 909 by the thin plate 908 and the conductor coating of the member 906, a capacitor function is realized. Also in this second variation, the same actions and effects as in the second embodiment and the first variation of the second embodiment are obtained.

Figure 21:
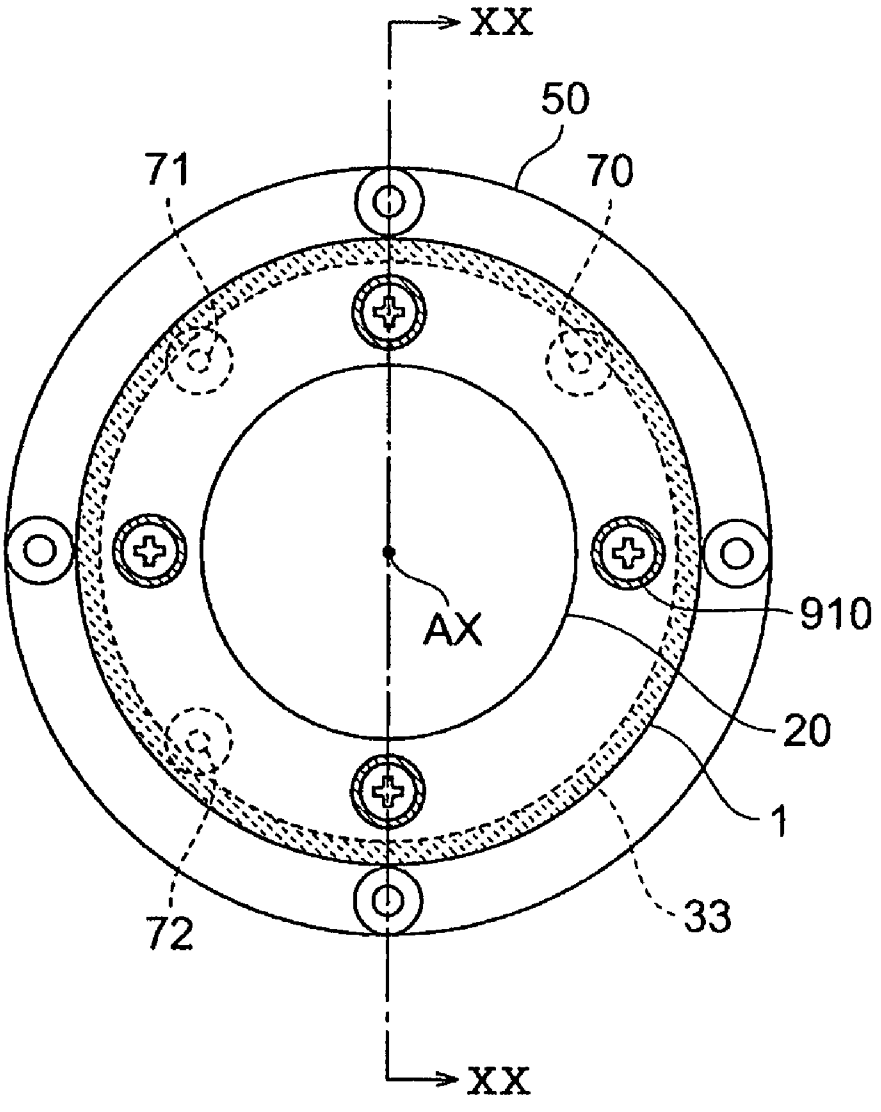
FIG. 21 is a front view showing a construction of a third embodiment of the charged-particle detecting apparatus according to the present invention.
Figure 22A:
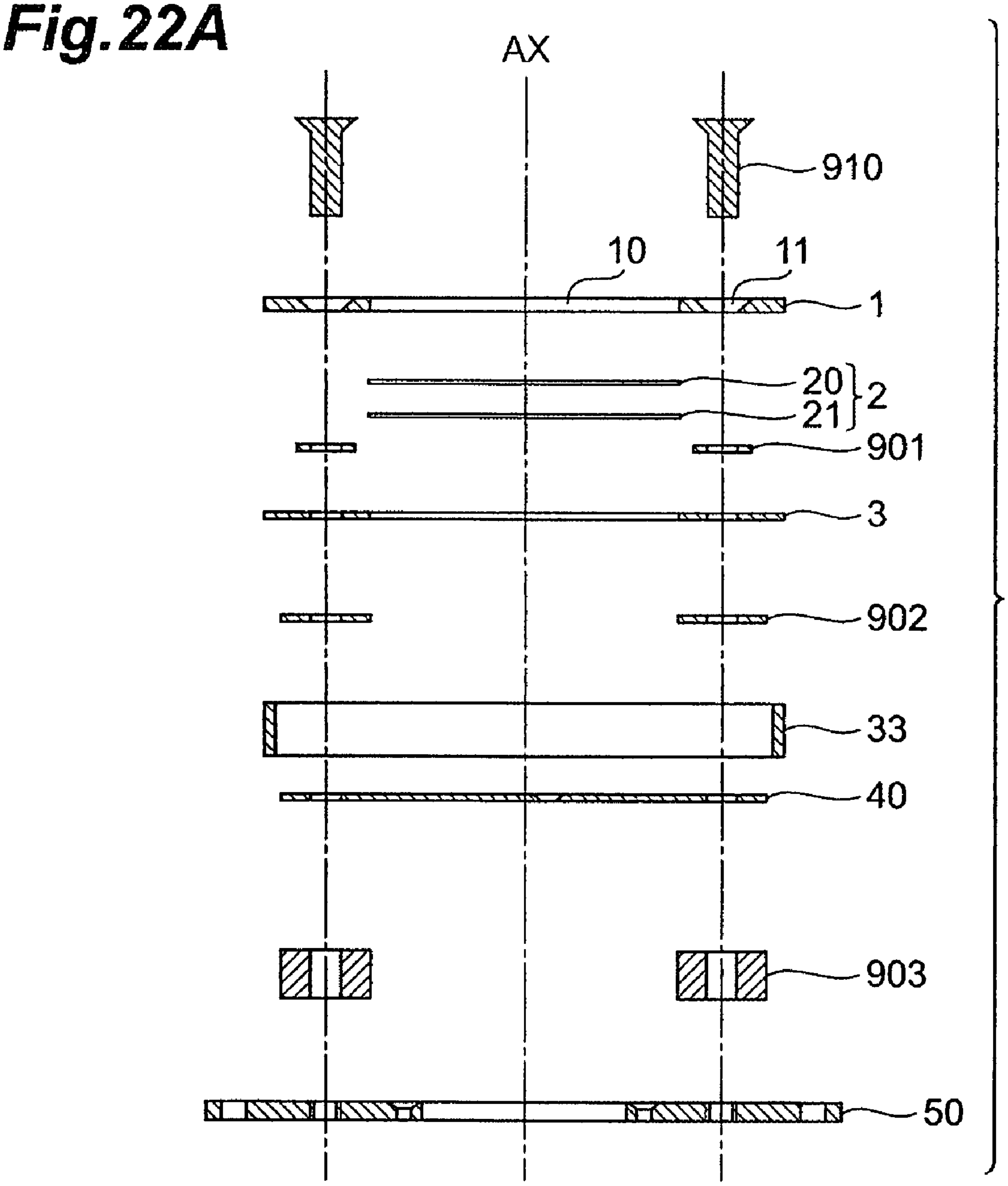
FIG. 22A is a cross-sectional view of the charged-particle detecting apparatus of the third embodiment along the XX-XX line of FIG. 21.

FIG. 21 is a front view showing a construction of a third embodiment of the charged-particle detecting apparatus according to the invention. FIG. 22A is a cross-sectional view of the charged-particle detecting apparatus of the third embodiment along the XX-XX line of FIGS. 21, and 22B is a perspective view showing a cylindrical capacitor (second capacitor).

Figure 22B:
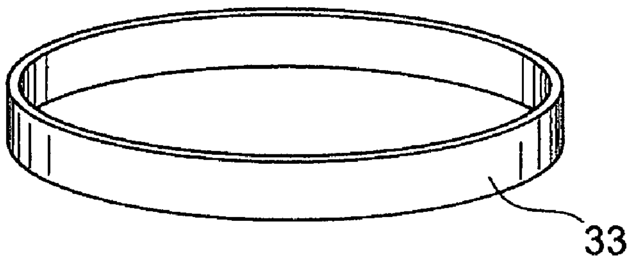
FIG. 22B is a perspective view showing a cylindrical capacitor (second capacitor)

The charged-particle detecting apparatus of the third embodiment is different from the first embodiment in that a cylindrical capacitor 33 as shown in FIG. 22B is applied instead of the capacitor 80 (including the thin plates 801 and 802 as electrodes) of the first embodiment. The cylindrical capacitor 33 is different from the cylindrical capacitor 81 of the second embodiment, and its outer periphery is substantially equivalent to the OUT electrode 3. The inner periphery of the capacitor 33 is larger than the outer diameter of the anode substrate 40 forming a part of the anode electrode 4, and houses the anode substrate 40 and the insulators 903 inside.

In this construction, a ringing suppressing capacitor can be easily arranged similar to the second embodiment. The capacitor 33 covers, in conjunction with the rear cover 5, a space between the anode electrode 4 and the BNC terminal 6 as a signal output part from the outside, so that the capacitor 33 functions as an electromagnetic shield. In this case, an effect of suppressing incidence of a false signal on a portion between the anode electrode 4 and the BNC terminal 6 and improving output performance is also obtained. Of course, according to this third embodiment, the same actions and effects as in the first and second embodiments are also obtained.

Figure 23:
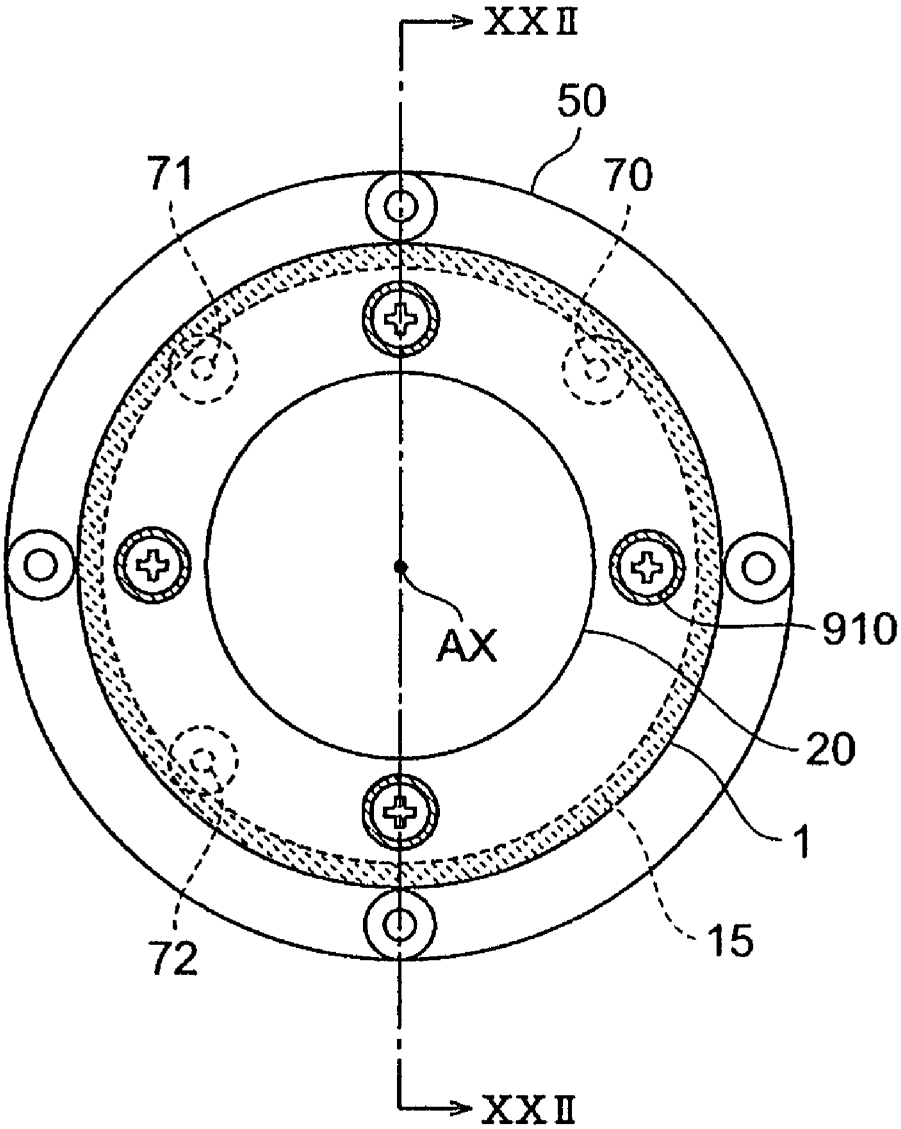
FIG. 23 is a front view showing a construction of a fourth embodiment of the charged-particle detecting apparatus according to the present invention.
Figure 24A:
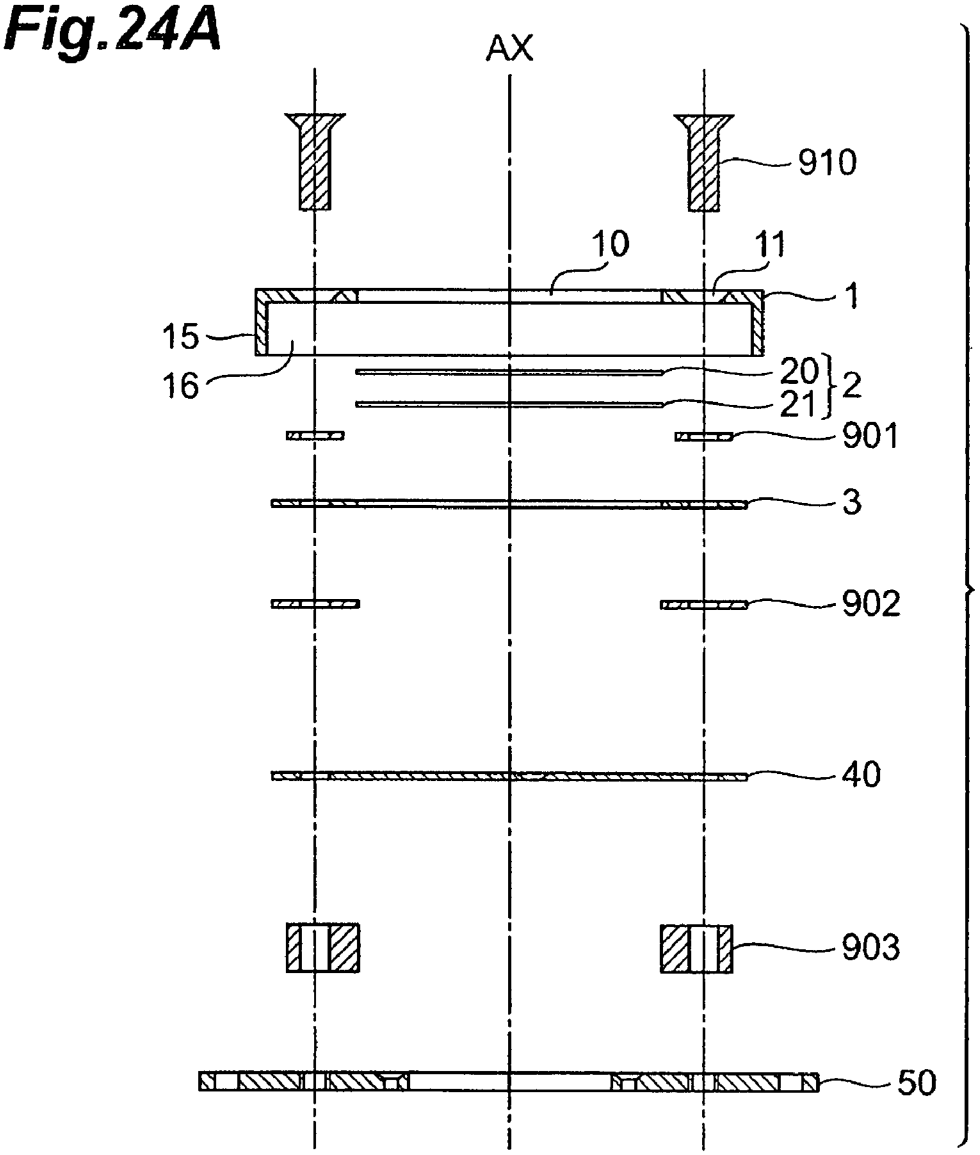
FIG. 24A is a cross-sectional view of the charged-particle detecting apparatus of the fourth embodiment along the XXII-II line of FIG. 23.
Figure 24B:
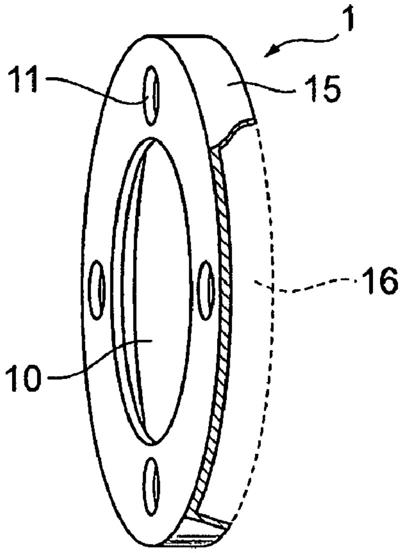
FIG. 24B is a perspective view showing a variation of an IN electrode.

Furthermore, FIG. 23 is a front view showing a construction of a fourth embodiment of the charged-particle detecting apparatus according to the present invention. FIG. 24A is a cross-sectional view of the charged-particle detecting apparatus of the fourth embodiment along the XXII-XXII line of FIGS. 23, and 24B is a perspective view showing a variation of the 1N electrode.

The charged-particle detecting apparatus of the fourth embodiment basically has the same structure as that of the first embodiment. In FIGS. 23 and 24A, the capacitors 62 and 80 are omitted. The difference between the fourth embodiment and the first embodiment is in that the IN electrode 1 is not in a simple disk shape but is provided with a side wall 15 extending toward the back surface side (rear cover 5 side) on the outer edge of the disk portion as shown in FIG. 24B. By employing the IN electrode 1 thus shaped, the components including the MCP group 2, the OUT electrode 3, and the anode substrate 40, etc., positioned between the IN electrode 1 and the rear cover 5 are housed in the space 16 surrounded by the side wall 15.

By employing this structure for the IN electrode 1, the side wall 15 functions as a shield and suppresses influences from the outside on the electric field to be formed. That is, by employing the IN electrode 1 shaped as shown in FIG. 24B, the detection performance of the charged-particle detecting apparatus of the fourth embodiment is dramatically improved.

Figure 25:
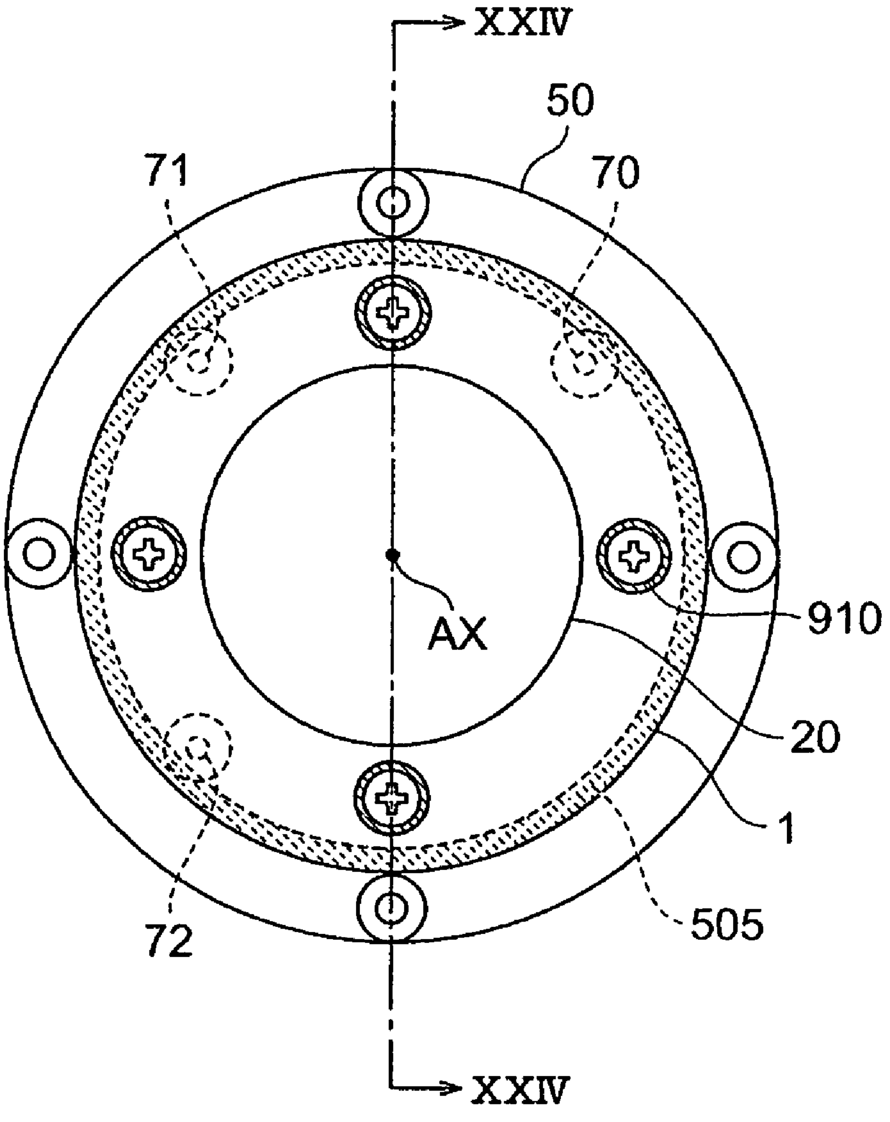
FIG. 25 is a front view showing a construction of a variation of the charged-particle detecting apparatus of the fourth embodiment.
Figure 26A:
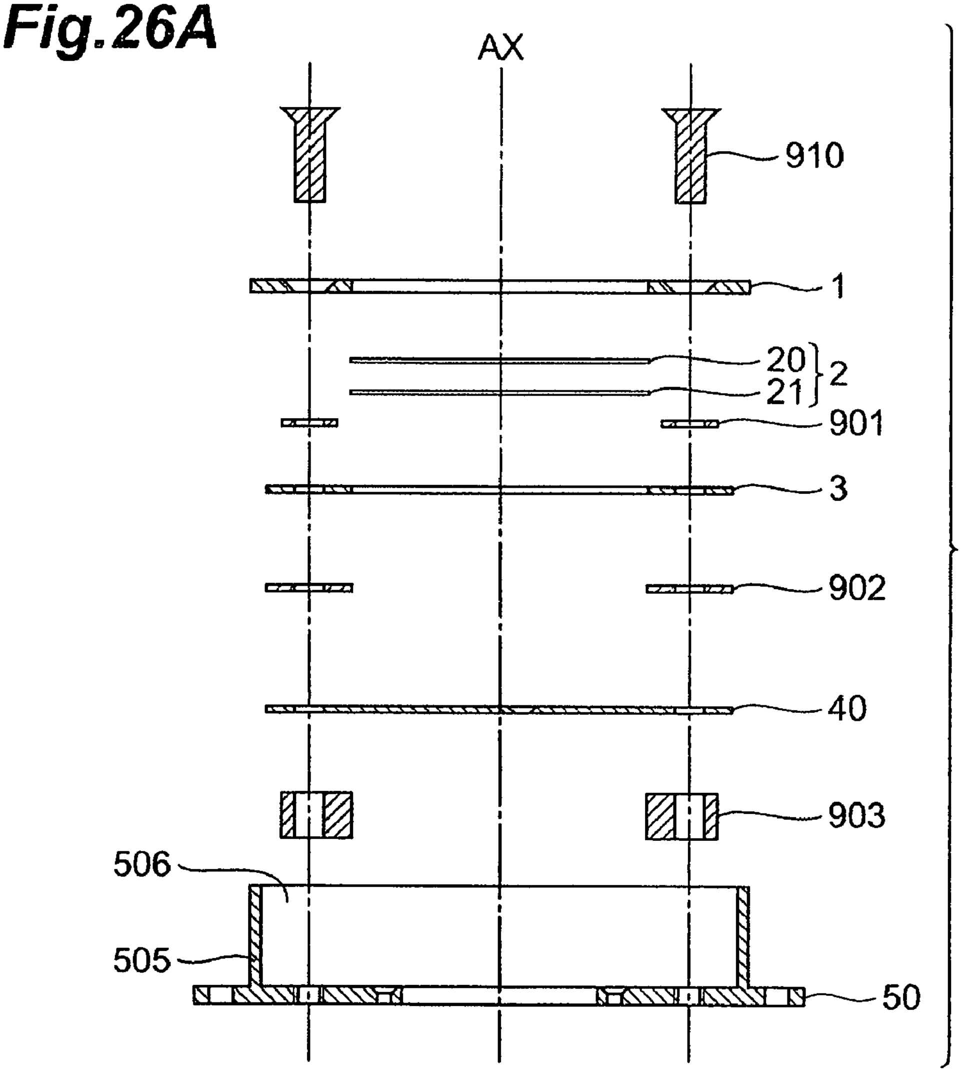
FIG. 26A is a cross-sectional view of the charged-particle detecting apparatus of the variation of the fourth embodiment along the XXIV-XXIV line of FIG. 25.
Figure 26B:
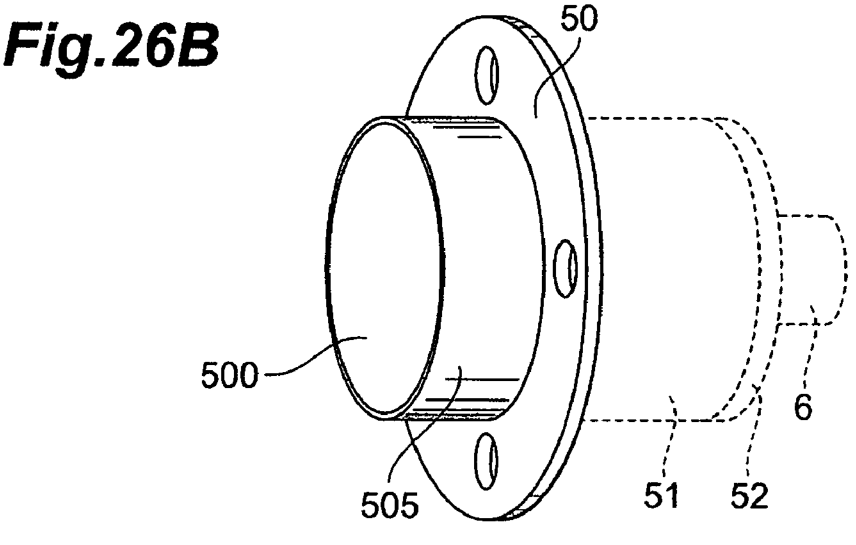
FIG. 26B is a perspective view showing a variation of a rear cover.

FIG. 25 is a front view showing a construction of a variation of the charged-particle detecting apparatus of the fourth embodiment. FIG. 26A is a cross-sectional view of the charged-particle detecting apparatus of the variation of the fourth embodiment along the XXIV-XXIV line of FIG. 25, and FIG. 26B is a perspective view showing a variation of the rear cover.

In the charged-particle detecting apparatus of the variation of the fourth embodiment, the shape of the IN electrode 1 is the same as in the first embodiment, however, the shape of the rear cover 5 is different from that in the first embodiment. That is, as shown in FIG. 26B, on the substrate 50 of the rear cover 5, a side wall 505 projecting forward (toward the IN electrode 1 side) is provided on the disk portion, and this side wall 505 functions as a housing for housing the components (MCP group 2, OUT electrode 3, and anode substrate 40, etc.) disposed between the IN electrode 1 and the rear cover 5 in its internal space 506. That is, instead of the side wall 15 of the IN electrode 1, the side wall 505 of the substrate 50 of the rear cover 5 functions as a shield. Also in this construction, the same action and effect as in the fourth embodiment are obtained.

In the embodiments and variations described above, two MCPs are applied as the MCP group 2, however, an arbitrary number of MCPs (may be one or three or more) may be applied according to the use of the detector. The BNC terminal 6 is applied as a signal output part, however, other output terminals may be applied, or it may be coaxial cable. In the above-described embodiment, metal rods are applied as leads 70 through 72, however, this is not intended to hinder application of coaxial cable and other leads.

As described above, according to the charged-particle detecting apparatus according to the present invention, the IN electrode (first electrode) and the potential distribution around this IN electrode are simplified, so that by adjusting this potential distribution, the flight loci of the charged particles can be stably maintained even in a different voltage-applied state. That is, whichever polarity the charged particles have, this charged-particle detecting apparatus enables stable detection of the charged particles with the same accuracy.

In the charged-particle detecting apparatus according to the present invention, application of the capacitor enables outputting of a detection signal to the outside of the detector at a ground potential. Thereby, the output signal processing system is simplified, and ringing is effectively suppressed. That is, according to this charged-particle detecting apparatus, detection accuracy is comparatively improved. By arranging the capacitor as described above, the whole apparatus can be downsized and the manufacturing process can be simplified.

Furthermore, according to the charged-particle detecting apparatus according to the present invention, it is also possible that any of the second capacitor, the IN electrode, and the rear cover covers the components, and the components are electromagnetically shielded and disturbance of the electric field can be further suppressed. That is, according to this charged-particle detecting apparatus, charged-particle detection performance can be stabilized.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A charged-particle detecting apparatus, comprising:

a micro channel plate, arranged on a plane crossing a predetermined reference axis, emitting secondary electrons multiplied therein in response to incidence of charged particles, said micro channel plate having an incidence surface on which the charged particles are made incident and an exit surface which faces said incidence surface and emits the secondary electrons;

a first electrode arranged so as to cover said incidence surface of said micro channel plate while crossing the reference shaft, said first electrode having an opening through which the charged particles going toward said micro channel plate pass;

a second electrode arranged so as to sandwich said micro channel plate together with said first electrode while crossing the reference axis, said second electrode having an opening through which the secondary electrons outgoing from said exit surface of said micro channel plate pass;

a third electrode arranged so as to sandwich said second electrode together with said micro channel plate while crossing the reference axis;

a signal output part including a signal line electrically connected to said third electrode; and a rear cover arranged in a state that the reference axis penetrates its internal space so that said rear cover is positioned on the opposite side of said micro channel plate with respect to said third electrode, wherein the surface of said first electrode, excluding a region that faces said micro channel plate, is exposed so as to function as a part of the outer surface of said charged-particle detecting apparatus, and wherein at least said micro channel plate, said second electrode, and said third electrode, which are arranged between said first electrode and said rear cover along the reference axis, have contours whose section sizes are equal to or smaller than that of the contour of said first electrode when viewed from said first electrode side toward said rear cover.

2. A charged-particle detecting apparatus according to claim 1, further comprising a first capacitor arranged between said third electrode and said rear cover, said first capacitor having one side terminal electrically connected to said signal line included in said signal output part and the other side terminal electrically connected to said third electrode.

3. A charged-particle detecting apparatus according to claim 1, wherein said signal output part includes a coaxial cable having said signal line and a shield surrounding said signal line, and wherein said charged-particle detecting apparatus further comprises a second capacitor arranged between said micro channel plate and said rear cover, said second capacitor having one side terminal electrically connected to said shield and the other side terminal electrically connected to said second electrode.

4. A charged-particle detecting apparatus according to claim 3, further comprising an insulating member housing said second capacitor therein in a state that said third electrode is fixed.

5. A charged-particle detecting apparatus according to claim 3, wherein, said second capacitor is arranged inside a support column for fixing at least said third electrode.

6. A charged-particle detecting apparatus according to claim 3, wherein said second capacitor has a cylindrical shape and is arranged so as to cover at least an outer edge of said third electrode.

7. A charged-particle detecting apparatus according to claim 1, wherein a maximum width of said first electrode along a direction orthogonal to the reference axis is larger than a maximum width of each of at least said micro channel plate, said second electrode, and said third electrode that are arranged between said first electrode and said rear cover, along the direction orthogonal to the reference axis.

8. A charged-particle detecting apparatus according to claim 7, wherein said rear cover has a shape extending toward said first electrode side, and has a housing for housing at least a part of components positioned between said first electrode and said rear cover in its internal space.

9. A charged-particle detecting apparatus according to claim 7, wherein said first electrode has a shape extending toward said rear cover side, and has a side wall for housing at least a part of components positioned between said first electrode and said rear cover in its internal space.

* * * * *